United States Patent
Chen et al.

(10) Patent No.: US 12,112,373 B2
(45) Date of Patent: Oct. 8, 2024

(54) SECURE AND TRUSTWORTHY CROSSING NETWORK FOR TRANSFERRING ASSETS OUTSIDE OF EXCHANGE

(71) Applicant: Enclave Markets Inc., San Francisco, CA (US)

(72) Inventors: Yuqun Chen, Westchester, PA (US); Xander Dunn, New York, NY (US); Michael Edmond Kaplan, Brooklyn, NY (US); Bernard Wong, Waterloo (CA); Emin Gun Sirer, New York, NY (US); David Wells, New York, NY (US); Phil Wirtjes, New York, NY (US); Oliver Hopcroft, New York, NY (US); Stephen Bezek, New York, NY (US)

(73) Assignee: Enclave Markets Inc., San Francisco, CA (US)

( * ) Notice: Subject to any disclaimer, the term of this patent is extended or adjusted under 35 U.S.C. 154(b) by 0 days.

(21) Appl. No.: 17/887,319

(22) Filed: Aug. 12, 2022

(65) Prior Publication Data
US 2024/0029157 A1 Jan. 25, 2024

Related U.S. Application Data

(60) Provisional application No. 63/391,205, filed on Jul. 21, 2022.

(51) Int. Cl.
*G06Q 40/04* (2012.01)
(52) U.S. Cl.
CPC ......... *G06Q 40/04* (2013.01); *G06Q 2220/00* (2013.01)
(58) Field of Classification Search
CPC .................. G06Q 40/04; G06Q 2220/00
(Continued)

(56) References Cited

U.S. PATENT DOCUMENTS 7,376,614 B1 5/2008 Scheinberg et al.
9,673,975 B1 6/2017 Machani
(Continued)

OTHER PUBLICATIONS bitpay.com [online], "How to accelerate incoming bitcoin transactions (Child Pays For Parent)," Sep. 2021, retrieved on May 5, 2022, retrieved from URL<https://support.bitpay.com/hc/en-us/articles/360049872312-How-to-accelerate-incoming-bitcoin-transactions-Child-Pays-For-Parent-#:~:text=Bitcoin's%20Child%20Pays%20For%20Parent,difference%20on%20the%20parent's%20behalf>, 8 pages.
(Continued)

*Primary Examiner* — Courtney P Jones
(74) *Attorney, Agent, or Firm* — Barnes & Thornburg LLP

(57) ABSTRACT

In one implementation, a system to provide a secure crossing network for trading digital blockchain assets outside of an exchange can include a crossing network program that is configured to provide a crossing network for the digital blockchain assets and a computer system with a secure enclave that is configured to provide the trusted execution environment within which processing of programs is secure from observation and manipulation by other operations outside of the secure enclave. The execution of the crossing network program in the secure enclave receiving, from client devices, crossing network orders to trade assets within the crossing network; matching at least a portion of the crossing network orders in an order book; obtaining, using a pricing oracle, pricing information for transactions in the exchange; and determining a reference price for the matched orders within the crossing network based on the pricing information from the exchange.

29 Claims, 21 Drawing Sheets

(58) Field of Classification Search
USPC .......................................................... 705/64
See application file for complete search history.

(56) References Cited

U.S. PATENT DOCUMENTS

| | | | |
|---|---|---|---|
| 9,875,368 B1 | 1/2018 | Willden et al. | |
| 2007/0156567 A1 | 7/2007 | Odintsov et al. | |
| 2009/0234768 A1 | 9/2009 | Slyke | |
| 2013/0317970 A1* | 11/2013 | Monroe | G06Q 40/04 |
| | | | 705/37 |
| 2014/0019764 A1 | 2/2014 | Gopal et al. | |
| 2014/0325235 A1 | 10/2014 | Thompson et al. | |
| 2014/0325644 A1 | 10/2014 | Oberg et al. | |
| 2015/0170273 A1* | 6/2015 | Barry | G06Q 40/04 |
| | | | 705/37 |
| 2015/0332393 A1* | 11/2015 | Kerpel | G06Q 40/04 |
| | | | 705/37 |
| 2016/0182531 A1 | 6/2016 | Rubakha et al. | |
| 2016/0292680 A1* | 10/2016 | Wilson, Jr. | G06Q 40/06 |
| 2017/0004578 A1* | 1/2017 | Cooper | G06Q 30/0633 |
| 2017/0011460 A1 | 1/2017 | Molinari et al. | |
| 2017/0352027 A1 | 12/2017 | Zhang et al. | |
| 2018/0189880 A1* | 7/2018 | Kronwall | G06Q 40/06 |
| 2018/0330079 A1 | 11/2018 | Gray | |
| 2019/0013932 A1 | 1/2019 | Maino et al. | |
| 2019/0034920 A1 | 1/2019 | Nolan et al. | |
| 2019/0095879 A1 | 3/2019 | Eyal et al. | |
| 2019/0114706 A1 | 4/2019 | Bell et al. | |
| 2019/0156301 A1 | 5/2019 | Bentov et al. | |
| 2019/0180273 A1* | 6/2019 | Cummings | G06Q 20/02 |
| 2019/0306235 A1 | 10/2019 | Veale et al. | |
| 2019/0377724 A1* | 12/2019 | Pennington | G06Q 20/389 |
| 2020/0020032 A1* | 1/2020 | Bleznak | G06Q 20/3678 |
| 2020/0104835 A1* | 4/2020 | Day | G06Q 20/389 |
| 2020/0143471 A1* | 5/2020 | Jackson | G06Q 20/3678 |
| 2020/0211109 A1* | 7/2020 | Bean | G06Q 20/108 |
| 2020/0258148 A1* | 8/2020 | Hummer | H04L 9/3239 |
| 2020/0310789 A1 | 10/2020 | Zhou et al. | |
| 2021/0049695 A1* | 2/2021 | Ma | G06Q 40/04 |
| 2021/0166313 A1 | 6/2021 | Cho | |
| 2021/0319479 A1* | 10/2021 | Taudes | G06Q 20/02 |
| 2021/0407002 A1* | 12/2021 | Moy | G06Q 40/03 |
| 2022/0012699 A1* | 1/2022 | Rutter | G06Q 20/3829 |
| 2022/0012725 A1* | 1/2022 | Rutter | G06Q 20/02 |
| 2022/0075892 A1* | 3/2022 | Jayaram | G06Q 20/3829 |
| 2022/0198563 A1 | 6/2022 | Kaplan et al. | |
| 2022/0261906 A1* | 8/2022 | Stevens | G06Q 40/04 |

OTHER PUBLICATIONS

Developer.Samsung.com [online], "Samsung Blockchain Keystore", published on or before Dec. 21, 2021, retrieved on Feb. 25, 2022, retrieved from URL<https://developer.samsung.com/blockchain/keystore/overview.html>, 2 pages.

github.com [online], "estimatesmartfee always returns "Insufficient data or no feerate found" #11500," Oct. 15, 2017, retrieved on May 5, 2022, retrieved from URL<https://github.com/bitcoin/bitcoin/issues/11500>, 9 pages.

Github.com [online], "Mobile Coin Foundation", published on or before Dec. 21, 2021, retrieved on Feb. 25, 2022, retrieved from URL<https://github.com/mobilecoinfoundation/mobilecoin#overview>, 8 pages.

IBM.com [online], "Turning on the Lights in Africa", published on or before Dec. 21, 2021, retrieved on Feb. 25, 2022, retrieved from URL<https://www.ibm.com/case-studies/irene-energy-hybrid-cloud-blockchain/>, 13 pages.

PCT International Search Report and Written Opinion in International Application No. PCT/US2022/036307, mailed on Aug. 15, 2022, 7 pages.

PCT International Search Report and Written Opinion in International Appln. No. PCT/US2021/64940, dated Mar. 17, 2022, 16 pages.

Nasdaq, "The Midpoint Extended Life Order (M-ELO): Frequently Asked Questions", nasdaq.com/solutions/canada-m-elo (2021), 2 pages.

Extended Search Report in EP Application No. 23187127.8, dated Oct. 27, 2023, 12 pages.

Moosavi, Mahsa et al., "Trading on-chain: how feasible is regulators' worst-case scenario?", arxiv.org, 201 Olin Library Cornell University Ithaca, NY, Jan. 15, 2021, 13 pages.

Pasdar, Amirmohammad et al., "Blockchain Oracle Design Patterns", arxiv.org, 201 Olin Library Cornell University Ithaca, NY, Jun. 17, 2021, 25 pages.

* cited by examiner

SECURE AND TRUSTWORTHY CROSSING NETWORK FOR TRANSFERRING ASSETS OUTSIDE OF EXCHANGE

CROSS-REFERENCE TO RELATED APPLICATIONS

This application claims priority to U.S. Application Ser. No. 63/391,205, filed on Jul. 21, 2022. The disclosure of the prior application is considered part of the disclosure of this application, and is incorporated in its entirety into this application.

TECHNICAL FIELD

This document generally describes devices, systems, and methods related to transferring assets using a crossing network within a secure enclave environment.

BACKGROUND

A variety of computer systems have been developed to provide electronic exchanges that permit for and process transactions among market participants. For example, centralized and decentralized exchanges have been developed that permit for digital assets to be traded between market participants. Centralized exchanges can include, for example, a centralized ledger that is maintained by a centralized host to track and resolve asset ownership among market participants. Decentralized exchanges can include, for example, multiple ledgers that are maintained across multiple different hosts that, together, reconcile and resolve asset ownership among the market participants through consensus processes. Decentralized exchanges have been implemented using blockchain technology. Each blockchain can have a different exchange, asset, digital currency, cryptocurrency, or other type of token. To transfer assets from one blockchain or network to another, a user may pay significant transfer fees. Sometimes, these transfer fees can cost more than an amount of assets that are being transferred. Moreover, in some implementations, the user may not be able to transfer assets from one blockchain to another because the blockchains do not support cross-chain transfers.

Various secure computing environments have been developed, which can protect various aspects of processes within the secure computing environments from observation, detection, or manipulation by third party actors (e.g., malware). For example, secure computing enclaves have been developed that include hardware components of computing devices that provide operations to execute code in an encrypted environment that can shield the operations and/or data being processed from third party actors. For instance, a computing device can include one or more specialized processors that are configured to allow user-level and/or operating system code to define private and encrypted regions of memory, sometimes called enclaves.

SUMMARY

The document relates to secure and trustworthy crossing networks to provide for transfer of tokens, cryptocurrencies, and/or other digital assets outside of exchanges. For example, in equities, a crossing network is an alternative trading system that matches buy and sell orders for execution without first routing the order to an exchange or other displayed market. Crossing networks can offer a variety of advantages, such as providing crossing network participants with low commissions, along with anonymity for the buying and selling accounts. One of the purposes of a crossing network is to allow people to buy and sell outside public channels, and to do so in an anonymous manner. By bypassing public channels, asset transfers that happen over the crossing network may not affect the price of the security based on the crossing network transactions not being included in the exchange order book. The disclosed technology provides secure, efficient, and trustworthy crossing network environments that can be used to transfer digital assets and currencies, such as blockchain and/or other crypto assets, outside of public exchanges for such digital assets. The disclosed technology can additionally incorporate and use market information from the public exchanges to execute crossing network transactions in a manner that permits for the crossing network and the pricing of its transactions to still be connected to and influenced by the public-facing markets provided by exchanges—keeping the crossing network from becoming detached from the market pricing and movement for digital assets and currencies that public exchanges provide. For example, the disclosed technology can use oracles that are configured to poll exchanges for transaction and pricing information, which can be provided to the crossing network to generate reference pricing, which can be updated over time and used for filling orders within the crossing network. As another possibility, the oracles can be configured to subscribe to exchanges for transaction and pricing information, which can be pushed to the oracles (e.g., through web sockets).

The disclosed technology provides crossing networks through a trustless yet secure computing environment, such as an enclave. Because the enclave is trustless and secure, the crossing network may not be exploited by an operator of the enclave and/or crossing network, nor may the crossing network be exploited by third party actors or malicious entities. The crossing networks described herein can simplify asset transfers outside of exchanges by permitting clients to create and deposit digital assets in accounts that privately and securely exist within the crossing network, and then by subsequently transferring assets between accounts within the crossing network. The transfer of assets within the crossing network can persist privately and securely within the enclave running the crossing network. Clients can withdraw assets from their account on the crossing network, at which point the assets can be transferred to the client's wallet or account outside of the crossing network, such as by transferring the tokens on a blockchain corresponding to the withdrawn assets to the client's wallet.

The disclosed crossing network technology can be run within a secure computing environment, such as a secure enclave, which can be verified via remote attestation by one or more third party actors to ensure that the code loaded into and run to provide the crossing network is valid and secure. For example, one or more adjudicators can be anonymous nodes that are tasked with verifying that the crossing network code running in the enclave is valid and unaltered from a verified version of the crossing network code. The adjudicators can also be tasked with monitoring state changes to the blockchains in order to determine when deposits to and/or withdrawals from the crossing network have been made with regard to blockchains. The adjudicators can verify that the enclave and the crossing network code it is executing is valid and secure using remote attestation. One or more other entities, such as users that transfer tokens into the crossing network, can also perform remote attestation of the enclave and/or request that the adjudicators perform remote attestation.

One or more embodiments described herein can include a system to provide a secure crossing network for trading digital blockchain assets outside of a blockchain exchange, the system including a crossing network program that is configured to provide a crossing network for the digital blockchain assets; a computer system with a secure enclave that is configured to provide the trusted execution environment within which processing of programs is secure from observation and manipulation by other operations outside of the secure enclave, wherein execution of the crossing network program in the secure enclave comprises: loading the crossing network program into secure memory within the secure enclave; generating and providing, in response to a remote attestation challenge, one or more validation values generated based on at least a portion of the crossing network program loaded into the secure memory, the one or more validation values being used by one or more other computer systems to validate the crossing network program is authentic and unmodified; receiving, from client devices, crossing network orders to trade assets within the crossing network; adding the crossing network orders to an order book maintained within the secure memory for the crossing network; matching at least a portion of the crossing network orders in the order book; obtaining, using a pricing oracle, pricing information for transactions in the blockchain exchange occurring within a time period of the order matching; determining a reference price for the matched orders within the crossing network based on the pricing information from the blockchain exchange; and filling the matched orders within the crossing network at the reference price.

Other implementations of this aspect include corresponding methods, and include corresponding apparatus and computer programs recorded on one or more computer storage devices, to perform the operations of the crossing network program. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

In some implementations, the embodiments described herein can optionally include one or more of the following features. For example, the execution of the crossing network program in the secure enclave further includes receiving the remote attestation challenge from the one or more other computing systems outside the secure enclave; and wherein one or more values are transmitted to the one or more other computing systems. The remote attestation challenge request can be received from one or more adjudicator computing devices. The reference price can be determined based on a median price of the transactions included in the pricing information. The reference price can be determined based on a mean price of the transactions included in the pricing information. The reference price can be determined based on a median of the pricing information provided by a plurality of pricing oracles. The reference price can be determined based on a weighted mean of prices for the transactions included in the pricing information. The reference price can be determined based on excluding one or more outlier prices from among the transactions included in the pricing information. The reference price can be determined based on excluding one or more prices from among the transactions included in the pricing information based on a minimum transaction size. Adding a crossing network order to the order book can be performed in response to determining that a transaction size of the crossing network order meets a minimum transaction size. The orders can be assigned a unique transaction identifier. The system can further include transmitting the transaction identifier for the orders to the client devices. The system can further include receiving a cancellation request for a particular order identified by a particular transaction identifier; and removing the particular order from the order book based on the cancellation request.

The system can further include determining whether a crossing network order satisfies one or more conditions for being matched to another order in the order book; the crossing network order can be matched to the another order in the order book in response to the orders satisfying the one or more conditions. The one or more conditions can include a minimum order size. The one or more conditions can include a price band. The crossing network order can be matched to the another order in the order book when the reference price is within the price band. The one or more conditions can include a corresponding account for the order having a sufficient account balance to complete the order. An account can have a sufficient balance when the account has a current balance to cover a quantity of digital currency specified in the order and to cover an associated fee for the transaction within the crossing network. The system can further include identifying that a particular crossing network order associated with a particular account includes a prioritization request; deducting a prioritization fee from the particular account; and adding the particular crossing network order to a prioritized position in the order book. The system can further include a notification system outside of the secure enclave that is configured to transmit notifications to the client devices in response to transaction activity within the crossing network. The crossing network orders can include market orders. The market orders can include one or more conditions. The one or more conditions can include a duration during which the market order is valid. The one or more conditions can include a price range within which the market order is valid. The execution of the crossing network program can further include: receiving, from a first client device, a request to broadcast partial information related to a first crossing network order associated with the first client device; identifying, from the order book, the partial information for the first crossing network order; and providing information that indicates the partial information for the first crossing network order to at least a portion of the client devices. The partial information can identify at least one of the one or more conditions for the first crossing network order. The crossing network can maintain client accounts with account balances that identify digital assets tradable within the crossing network for a client accounts. Depositing the digital assets into the client accounts can include transferring the digital assets into one or more accounts associated with the crossing network, the one or more accounts being external to the crossing network, and in response to detecting and verifying the transfer of the blockchain tokens into the one or more accounts, incrementing the account balance for a corresponding client account within the crossing network. The digital assets can include blockchain digital assets. Transferring the digital assets into the one or more accounts can include transferring blockchain tokens into one or more on-chain wallets associated with the crossing network. Incrementing the account balance can be performed in response to detecting and verifying the transfer of the blockchain tokens into the one or more on-chain wallets. Incrementing the account balance can be performed while maintaining the corresponding blockchain tokens within the one or more on-chain wallets. Withdrawing digital assets from the crossing network can include identifying a quantity of the digital assets to be withdrawn and a destination address corresponding to a client's on-chain wallet, transferring one or more tokens corresponding to the quantity of digital assets from the on-chain wallets associated with the crossing network to the client's on-chain wallet, and updating a corresponding account balance within the crossing network to reflect withdrawal of the digital assets. The incrementing the account balance can be performed while maintaining the corresponding digital assets within the one or more accounts. Withdrawing digital assets from the crossing network can include identifying a quantity of the digital assets to be withdrawn and a destination address corresponding to a client's external account outside the crossing network, transferring one or more digital assets corresponding to the quantity of digital assets from the one or more accounts associated with the crossing network to the client's external account, and updating a corresponding account balance within the crossing network to reflect withdrawal of the digital assets. The matching operation can be performed continuously in response to each of the crossing network orders being received and added to the order book. The matching operation can be iteratively performed every $\tau$ period of time and independent of receiving and adding the crossing network orders to the order book. Every $\tau$ period of time can correspond to a plurality of predetermined times at which the matching operation is performed. The $\tau$ period of time can correspond to a predetermined time interval. The matching operation can be iteratively performed across a plurality of differing time intervals that, collectively, correspond to the $\tau$ period of time. An average of the plurality of differing time intervals can correspond to the $\tau$ period of time. After each iteration of the matching operation is performed, a next time interval of the plurality of differing time intervals can be determined based on an outcome of a stochastic process. The stochastic process can include a poisson dice roll process. The stochastic process can ensure an average time interval of the plurality of differing time intervals corresponds to the $\tau$ period of time. The crossing network orders can include associated crossing network transaction fees, the orders can be added to the order book with the associated crossing network transaction fees, and the execution of the crossing network program can further include sorting the crossing network orders within the order book based on the associated crossing network transaction fees. The matching can be performed by sequentially evaluating each of the crossing network orders in the order book for matches according to a sequence provided by the sorted order book. The sequence can include a first crossing network order with a greatest associated crossing network transaction fee is first in the sequence and is evaluated for matches first among the sorted order book, and a last crossing network order with a smallest associated crossing network transaction fee is last in the sequence and is evaluated for matches last among the sorted order book. The associated crossing network transaction fees can include percentages of the crossing network orders. The associated crossing network transaction fees can include flat fees of the crossing network orders. The associated crossing network transaction fees can be individually specified as part of the crossing network orders. The execution of the crossing network program can further include providing, to at least one of the client devices, information that indicates the greatest associated crossing network transaction fee from among the associated crossing network transaction fees. The execution of the crossing network program can further include: receiving, after providing the information and from the at least one of the client devices, updated crossing network transaction fees for a portion of the crossing network orders associated with the at least one of the client devices, wherein the updated crossing network comprise an increased network transaction fees; and sorting the crossing network orders within the order book based on the updated crossing network transaction fees. The execution of the crossing network program can further include iteratively performing the providing, the receiving, and the sorting steps based on the updated crossing network transaction fees. The execution of the crossing network program can further include deducting associated crossing network transaction fees from accounts within the crossing network that correspond to the matched crossing network orders.

The devices, system, and techniques described herein may provide one or more of the following advantages. For example, the disclosed technology can provide for secure, trusted, and private crossing networks for blockchain tokens and assets. In particular, the disclosed technology can provide crossing networks that are centralized yet free of operator or host interference, influence, or manipulation of the crossing networks. Additionally, the disclosed technology can provide for private and anonymous transactions that are influenced by current pricing conditions in market exchanges, but which are separated from and that do not directly influence the open market. For example, large orders that are placed on an exchange may, by themselves, cause the price of a currency to either increase or decrease as the order is filled by smaller opposing orders on the other side of the transaction. As a result, parties seeking to fill large orders may be discouraged from participating in the market because their own activity can work against their own price interests. The disclosed technology can provide mechanisms by which large orders can be filled at current market prices without the large orders, themselves, affecting market liquidity or price trend movements. Furthermore, the disclosed technology can provide a degree of control for crossing network participants to apply conditions to their orders, such as providing duration conditions, price limit conditions, and other conditions.

As another example, the disclosed technology provides for a simplified transaction structure within the crossing network and the secure enclave. For instance, tokens transferred into the secure enclave from blockchains are effectively parked in wallets that are controlled by the crossing network, and the crossing network receives confirmation of the assets corresponding to the parked tokens having been received. The crossing network can then use a simple representation of those assets with user accounts, which can persist entirely within the crossing network. For example, the simple representation can include a ledger and balance for each account, along with records of transactions between accounts. These representations can permit for quick and efficient matching, filling, and settling of transactions between accounts. The transactions between accounts within the crossing network can effectively be a proxy for transactions that otherwise would have occurred within a public exchange using the parked tokens. Assets can be transferred between accounts multiple times over within the crossing network before they are ultimately reconciled outside of the crossing network when a client withdraws funds, which can cause parked token stored in one or more of crossing network's wallets and corresponding to the withdrawn assets to be transferred to a wallet for the client making the withdrawal.

The disclosed technology can also provide one or more benefits to users. For example, some blockchains can impose gas prices that make interacting via smart contracts and transferring assets expensive and prohibitive. Sometimes, sending assets over a blockchain can cost more in transaction fees than the amount or quantity being moved. With the disclosed technology, the user may only pay transaction fees that cover gas for one transfer transaction to deposit assets in the crossing network (i.e., transfer assets into one or more wallets associated with crossing network on a blockchain), and then the gas for one transfer transaction to withdraw assets from the crossing network (i.e., transfer assets from one or more wallets associated with the crossing network into the client's wallet). Transactions within the crossing network may be provided outside of these gas prices, and may instead charge for transaction services in other ways (e.g., smaller transaction fee within crossing network, fixed or flat transaction fees, subscription fees within crossing network, fee to deposit or withdraw funds).

Remote attestation techniques can also be used to verify that the crossing network and its associated components, such as adjudicators, balance transfer services, and others, are operating correctly (i.e., running validated and authentic code base). Remote attestation can ensure to users that no entity has access to manipulate the crossing network, its associated components, or assets that are being transferred within the crossing network, except for the code itself running in the enclave. Secure transactions can be performed and the users can trust the enclave using the disclosed techniques.

The details of one or more implementations are set forth in the accompanying drawings and the description below. Other features and advantages will be apparent from the description and drawings, and from the claims.

BRIEF DESCRIPTION OF THE DRAWINGS

Like reference symbols in the various drawings indicate like elements.

DETAILED DESCRIPTION OF ILLUSTRATIVE EMBODIMENTS

This document relates to a secure enclave environment for transferring assets, such as digital assets, tokens, and cryptocurrencies, within a private and secure crossing network that is separate from public exchanges for the same assets. Such a secure enclave environment running the crossing network can, additionally, permit for the transactions within the crossing network to be influenced by pricing within the public exchanges, but may shield/prevent the transactions in the crossing network from influencing the pricing, liquidity, and trends in the public exchanges. The disclosed technology operates can provide trust, security, and privacy in the integrity of the crossing network, even though it is running on a server that may be controlled and operated by an unknown or unverified third party, because the crossing network code providing the crossing network can be verified through remote attestation via designated adjudicators (e.g., parties, entities, nodes). Since transfers of assets can be made within a secure enclave environment, the transfers may not be altered, modified, or otherwise influence by malicious actors, such as the operator of the enclave and crossing network, or other third parties.

Figure 1:
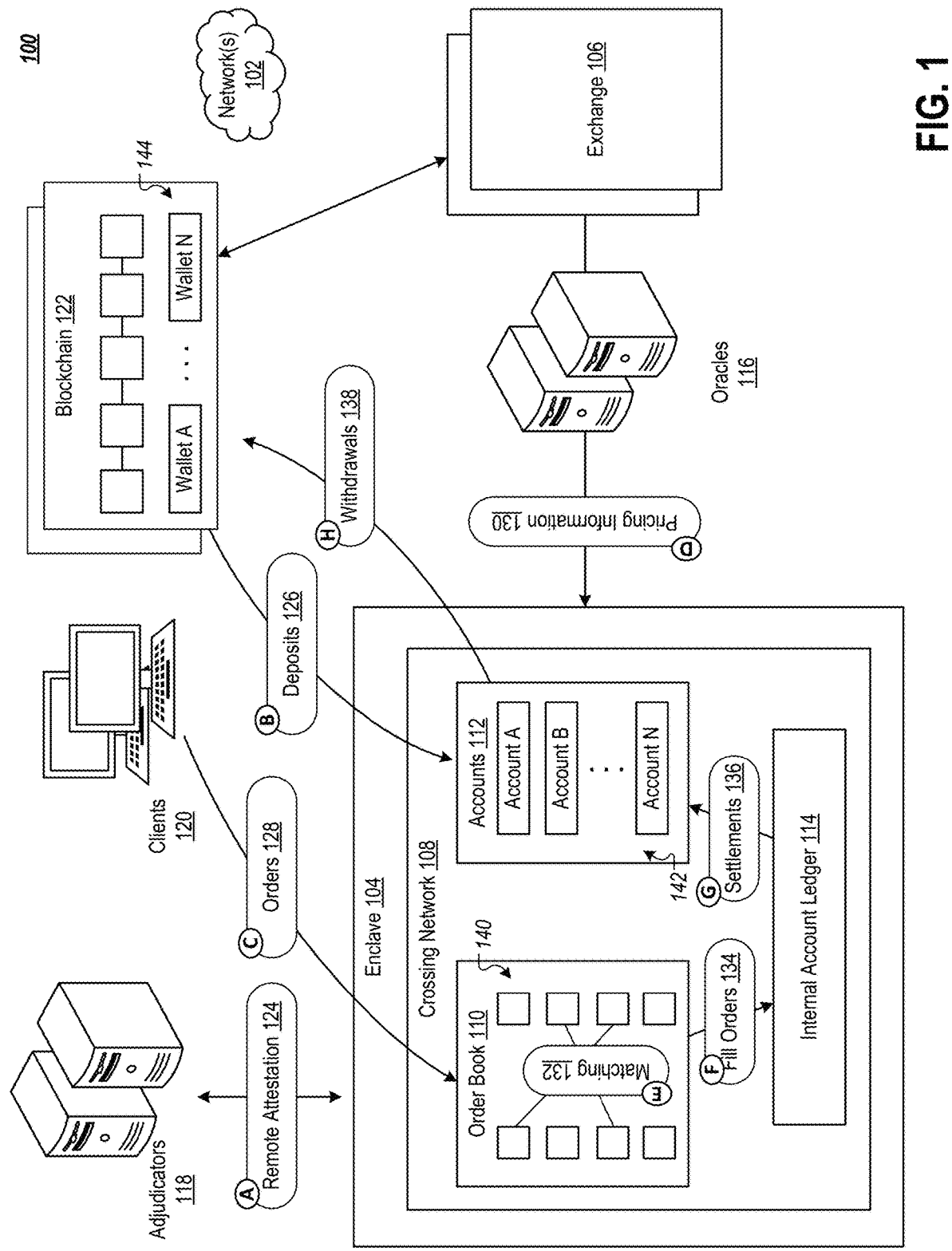
FIG. 1 is a conceptual diagram of an example secure enclave environment for a crossing network for blockchain assets.

FIG. 1 is a conceptual diagram of an example secure enclave environment 100 for a crossing network for blockchain assets. The example environment 100 includes a crossing network 108 that is running within a secure computing enclave 104, which can receive assets deposited from one or more blockchains 122 (step B, 126) and orders from clients 120 (step C, 128), process orders separate from one or more public exchanges 106 for those blockchain assets (step E-G, 132-126), and provide for withdrawal of assets from the crossing network 108 back to the blockchain 122 and associated client wallets 144 (step H, 128). The crossing network 108 can fill orders within the crossing network 108 based on market pricing information for the blockchain 122 assets within the public exchanges 106 through the use of one or more pricing oracles 116, which are configured to securely obtain and transmit transaction pricing information for transactions within the exchange 106 to the crossing network 108 (step D, 130). Additionally, although the crossing network 108 can process transactions within a centralized environment, it can establish trust and security with regard to the transactions being unmodified and unaffected by malicious actors through the use adjudicators 118 to remotely attest and verify the codebase for the crossing network 108 running within the enclave 104 (step A, 124). The components of the environment 100 can communicate via one or more networks 102 (e.g., internet, wireless network, wired network, virtual private network (VPN), local area network).

The blockchains 122 can include ledgers that provide secure ownership records for various digital assets, such as tokens and digital currency. Ownership of digital assets can be organized based on wallets 144, which can each have a unique address and corresponding private-public key pairs that are maintained by an owner of the wallets 144, and which can be used to validate and securely transfer assets between wallets 144. Markets for clients to trade digital assets in the blockchains 122 can be provided by exchanges 106, which can permit clients to submit orders to transfer assets, such as orders to purchase or sell digital assets. The exchanges 106 can match and fill orders, which can cause the corresponding digital assets being traded on the blockchain 122 to be transferred between the wallets 144 associated with the clients.

The enclave 104 and crossing network 108 can provide for securely transferring of token quantities from the blockchain 122 between clients 120 outside of the exchanges 106. The enclave 104 can be a secure computing environment that is operated on a server, computing system, and/or network of servers and/or computing systems. The enclave 104 can be stateless and constantly changing. This secure environment can be run by an operator. The enclave 104, when started up by the operator, can be verified by adjudicators 118 using remote attestation (step A, 124) to ensure that the right and secure code is being run by the right operator. For example, when the enclave 104 boots up, adjudicators 118 can interrogate the enclave 104 to validate its identity and/or validate the codebase that is loaded into and running the crossing network 108, such as by providing one or more signed hash values of the crossing network code as loaded into the enclave's secure memory. The enclave 104 may additionally rely upon the adjudicators 118 to recover various state and/or key information, such as through retrieving portions of one or more security keys that are split and distributed among the adjudicators 118. The adjudicators 118 can publish their remote attestation results for the enclave 104 and the crossing network 108, which can provide the clients 120 and/or other actors information about the validity, security, and trustworthiness of the crossing network 108.

The secure enclave environment 100 can be composed of a trusted and untrusted codebase. The trusted codebase can be a portion of the codebase that runs within the enclave 104 and the untrusted code can run outside of the enclave 104. The untrusted code, for example, can be responsible for initializing and starting the enclave 104 as well as executing remote attestation of the enclave 104. Remote attestation using the adjudicators 118 is a process by which a third party can attest to a remote entity that it is trusted, and establish an authenticated communication channel with that entity. As part of attestation, the enclave 104 can prove its identity, that the source code for the crossing network 108 has not been tampered with or otherwise altered, and that the enclave 104 is running on a genuine enabled platform with latest security updates. The adjudicators 118 can be remote servers or other computing systems that are trusted partners of the enclave 104. The adjudicators 118 can be anonymous and in communication with the enclave 104 and, in some instances, can monitor the blockchains 122 for on-chain events, such as transferring tokens from a user's address to one or more of the crossing network's wallets 144. The adjudicators 118 can verify such on-chain events and broadcast such on-chain events, which can, for example, initiate deposits of digital assets into the crossing network (step B, 126).

Private keys for wallet addresses used by the enclave 104 on the blockchains 122 can be derived from a single master secret key. The master secret key can be securely kept within the enclave 104. The master secret key can be split into shares using secret sharing techniques and distributed to the plurality of adjudicators 118. The secret shares can be transmitted through transport layer security (TLS) and/or remote attestation. On restart, the enclave 104 can, for example, fetch K of N shares of the master secret key from the adjudicators 118 to recompute the master secret key. The master secret key can then be used to rederive the private keys for addresses on the blockchains 122, which can be used to process deposits to and/or withdrawals from accounts in the crossing network 108.

To participate in the crossing network 108, clients can go through an onboarding, which can include an individual or institutional onboarding flow. Such an onboarding process can be run by the crossing network 108 itself and/or other computing devices/systems, such as service providers via APIs or iframes service. Once onboarded, clients will receive accounts 112 within the crossing network 108, with each client including one or more individual accounts 142 that represent their current balance of assets within the crossing network 108. Each account may be associated with one or more public-private key pairs, which can be used to validate client actions within the crossing network 108, such as deposit requests, order requests, withdrawal requests, and/or other requests from clients 120.

Once a client's account is approved and established in the crossing network 108, the client can select assets they would like to deposit to trade within the crossing network, such as assets from the blockchains 122 (step B, 126). A unique deposit address can be assigned to each client and/or each deposit. Once the client sends funds to the deposit address and the funds have been confirmed as received, such as by one or more adjudicators 118 (i.e., balance transfer adjudicators), the client's account 112 in the crossing network 108 can be credited with the funds.

A client with funds deposited to their account 112 can then place a trade request (step c, 128). A trade request can include the amount desired to be traded as well as potential conditions associated with the trade request, such as price band that indicates a range of acceptable prices at which the trade request may be fulfilled, and/or a duration of the trade request to persist within the crossing network 108 before being automatically cancelled if unfilled. For example, a client who has deposited 100 ETH can place an order to sell all 100 ETH on the crossing network for a price of 7-8 BTC and for a duration of 10 days, after which the order will be automatically cancelled if a matching order is not located (e.g., a buyer of ETH did not submit a corresponding trade request within 10 days and/or a price of ETH was not within the price band specified by the seller during the 10 days). The client can submit and confirm their order details, such as through one or more validation steps, and the order can be placed into the crossing network's order book 110. In some instances, a client may submit multiple orders in the same currency in order to adjust the amount and duration variables, as well as seek to capitalize a market price they consider to be favorable. However, the crossing network 108 can limit to the number of orders a customer may place concurrently in the order book 110 (e.g., max of 20 separate orders per customer per currency), which can prevent attempts to manipulate transactions and matches within the order book 110.

The crossing network 108 can match live orders 140 within the order book 110 by identifying orders with corresponding conditions on opposing sides of a transaction (step E, 132). For example, another client may onboard and fund their account 112 with an alternate currency, and may place an order in the opposite direction of a previously placed (but not filled) order. The new order can be immediately matched within the order book 110 and filled at a reference price at the time of order execution (step F, 134). Filling the order can involve removing the corresponding requests from the order book 110 and adding the filled order to an internal account ledger 114, which can provide a log of matched and filled transactions. The reference price can determined based on pricing information from current market prices within the exchange 106. For example, one or more pricing oracles 116 can obtain pricing information for transactions over a period of time (e.g., past second, past minute, past hour) within the exchange 106, and can provide the pricing information to the crossing network 108 (step D, 130). The crossing network 108 can use the exchange pricing information from corresponding time periods to determine and set the reference price for filled transactions within the crossing network 108—permitting the crossing network 108 to reflect current market pricing trends in the exchange 106 while shielding those market pricing trends from transaction activity within the crossing network 108.

Once an order is filled, the internal account ledger 114 can cause the accounts 112 for both counterparties to a transaction to be updated (step G, 136). In addition to updating the accounts 112 to reflect current asset balance information after settling the transaction, the crossing network 108 can notify corresponding clients 120 of an executed order. Such notifications can be performed while keeping the identity of the counterparties anonymous to each other, and also keeping the identity of the counterparties wallets 144 and/or other addresses on public blockchain networks 122 secret. The notifications can additionally be restricted to only the counterparties, and may not be broadcast to others clients participating in the crossing network 108.

Clients may request to withdraw their funds to an external address (step H, 138), such as after settling of a trade has been settled and/or all orders associated with an asset balance have been canceled. Such withdrawals can involve, for example, transferring corresponding tokens from one or more wallets controlled by the crossing network 108 to a client wallet 144, and updating the corresponding balance for the user's account 112 to reflect the new balance after the withdrawal has been completed. Such on-chain transactions can be sent via API to a transaction monitoring service provider, which can be used to identify any potentially high risk transactions. If such high risk transactions are identified, it can prompt an investigation and determine if any further action is required.

The crossing network 108 can permit for multiple, contemporaneous orders to be listed in the order book 110 for a digital asset. However, such multiple orders may be limited by one or more factors, such as a maximum quantity of orders that may be listed at a time. Such limits can allow, for example, various amount and duration orders and orders placed at different times with different spot prices.

The pricing oracles 116 can be used to provide price feeds, which can be used to determine reference pricing by the crossing network 108. For example, the pricing oracles 116 can be used to provide multiple price feeds to determine a reference price for a period of time, which can be determined using any of a variety of statistical techniques (e.g., median price, average price, excluding outlier prices, etc.).

The crossing network 108 can be used by any of a variety of clients, including clients who may seek to execute larger trades without directly influencing the market trends and liquidity within the exchange 106. Such clients can include, for example, OTC desks, prime brokers, borrow/bend brokers, high net worth individuals, and/or others.

Figure 2:
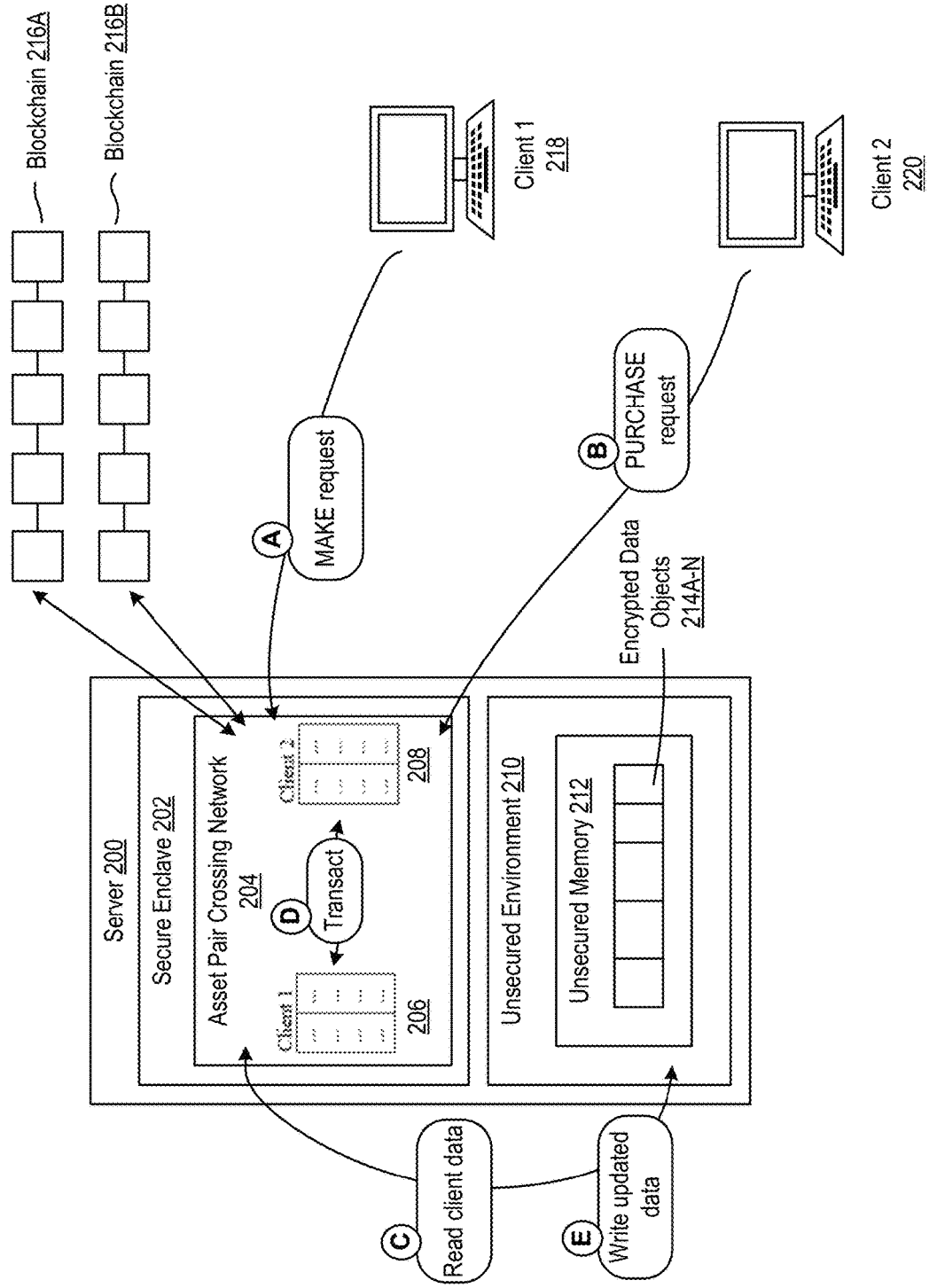
FIG. 2 is a conceptual diagram of an enclave crossing network.

FIG. 2 is a conceptual diagram of an enclave crossing network. A server 200 houses both a secure environment 202 and an unsecure environment 210. The server 200 can be in communication (e.g., wired and/or wireless) with a client 1 218 and a client 2 220. The server 200 can communicate with a plurality of client computing devices, all of which are associated with users seeking to transact via the enclave crossing network described herein. In some examples, the server 200 can be one or more physical servers hosted on public clouds.

Housing both environments 202 and 210 on the server 200 is advantageous because it provides for faster and more secure transacting. When the environments 202 and 210 are located on the blockchain, anonymous nodes interact with each other to complete a transaction, which can take more time to verify the transaction but also increases a risk that the anonymous nodes manipulate the exchange, thereby resulting in an unequal and unfair trading environment. To prevent this problem, the secure environment 202 (e.g., enclave crossing network) and the unsecured environment 210 (e.g., non-enclave environment) are housed by the server 200.

The secure environment 202 can be used to host one or more enclave crossing networks. The unsecured environment 210 is a non-enclave environment where data can be stored in encrypted format. The secure environment 202 includes an asset pair currency crossing network 204. The asset pair currency crossing network 204 is configured to convert and exchange any currency in a transaction. For example, the crossing network 204 can convert ETH from one user's account to Bitcoin in another user's account. Therefore, when clients make requests to perform buy or sell orders, the asset pair currency crossing network 204 can complete the requests within the secure environment 202.

The crossing network 204 can receive client data 206 and 208 (e.g., client accounts), which are associated with each of the clients that make requests to transact via the enclave crossing network. Clients can transact with each other even if they have different digital assets on different blockchains. Thus, the client data 206 and 208 can be received, by the crossing network 204, from more than one blockchain.

As illustrated in FIG. 2, the crossing network 204 currently includes client 1 data 206 and client 2 data 208 in, for example, the form of double ledger tables. Client 1 data 206 is associated with client 218 and client 2 data 208 is associated with client 220. The client data 206 and 208 can include information such as how much of a particular currency the client has (e.g., balance(s) with the crossing network), how much of a currency the client received in prior and/or current transactions, and how much of a currency the client spent in prior and/or current transactions. The clients 218 and 220 can deposit digital assets into their accounts, which would be reflected in the data 206 and 208 respectively. These deposits are encrypted with private keys that an operator of the secure environment 202 does not have. As a result, the operator cannot modify or control the clients' deposits or other account information—only the clients 218 and 220 maintain control over their digital assets. Moreover, the operator has no knowledge of the account balances of each client 218 and 220, which is advantageous to ensure that the operator maintains equal and fair trading in the secure environment 202.

In addition, the crossing network 204 can permit users (e.g., clients) to deposit and withdraw assets from the user balances. For example, a user may wish to keep a balance in the crossing network long-term, and may make a few initial deposits. Another user, though, may wish only to use the crossing network for a one-time transaction, in which case a deposit is made from a blockchain 216A, a crossing network is made, and the entirety of the resulting asset is deposited in a blockchain 216B.

The unsecured environment 210 includes unsecured memory 212 in which encrypted data objects 214A-N are stored. Because the secure environment 202 has no running memory, or less memory than may be required to run the crossing network 204, it is beneficial to store data in the unsecured memory 212 of the unsecured environment 210. This structure allows for the secure environment 202 to more quickly and efficiently perform transactions, verify data, and encrypt and decrypt data. All data that is stored in the unsecured memory 212 is encrypted inside the secure environment 202 and only the secure environment 202 has access to an encryption key.

As illustrated in FIG. 2, the secure environment 202 can receive a MAKE request from the client 1 218 in A. The MAKE request indicates that the client 218 has a currency or other digital asset that they want to convert into another currency or digital asset. In other words, the client 218 wants to make or start a transaction or trade, such as completing a sell order. The client 2 220 can transmit a PURCHASE request to the secure environment 202 in B. The PURCHASE request indicates that the client 220 has the currency or digital asset that the client 218 is requesting and that the device 220 wants to complete the trade offered by the client 218. In other words, the client 220 makes a buy order as a request. Other types of requests can be made to the secure environment 202. Digital assets other than cryptocurrencies can also be exchanged and/or transacted with in the secure environment 202.

As previously described, the asset pair currency crossing network 204 can access data from the blockchains 216A and 216B and/or unsecured memory 212 to receive the client data 206 and 208. The clients 218 and 220 can be trading different digital assets that are housed on different blockchains, so it is important that the crossing network 204 reconciles such differences to complete the transaction between the clients. In C, the crossing network 204 also accesses and reads in the client data 206 and 208, which are stored in the unsecured memory 212. Part of reading in the client data 206 and 208 is validating (e.g., using a signature matching function as described herein, such as in reference to FIGS. 4A-C) and decrypting the client data once the data 206 and 208 is received by the secure environment 202. The data 206 and 208 are validated inside the secure environment 202 to ensure that the encryption of the data 206 and 208 and/or the data itself has not been tampered with while in storage outside of the secure environment 202. If the data 206 and 208 have not been tampered with, they can be decrypted using the encryption key that is stored in the secure environment 202. The decrypted data 206 and 208 can now be updated to reflect the transaction between the clients 218 and 220.

Once the client data 206 and 208 is decrypted in the secure environment 202, the crossing network 204 can perform the transaction in D. For example, based on the trade established between the clients 218 and 220 (e.g., client 218 requests to sell their Bitcoin for Ether and client 220 requests to buy client 218's Bitcoin with their Ether), the crossing network 204 can accordingly adjust currency or other digital asset balances in the client data 206 and 208 associated with the clients 218 and 220.

An operator of the secure environment 202 can probably be prevented from gaining knowledge of the client devices 218 and 220 order (e.g., transaction), whether the order or request of a client has been matched, and whether there is a settlement and/or transfer of digital assets between client accounts. The operator is prevented from gaining this knowledge because the operator does not have access to encryption keys that are used to encrypt data associated with a transaction or order. This is beneficial to ensure that the operator cannot manipulate the order or crossing network to the disadvantage of any client. Clients retain control over their digital assets and maintain anonymity while transacting in the secure environment 202.

After the transaction is made in D, the client data 206 and 208 are updated to reflect the transaction, then encrypted (using the same encryption key for the original client data 206 and 208) and written back to the unsecured memory 212 in E for storage. The client data 206 and 208 are then erased from the secure environment 202. As mentioned, the secure environment 202 does not hold onto the updated client data 206 and 208 because the secure environment 202 does not have sufficient running memory for long-term storage. The updated client data 206 and 208 remain encrypted and stored in the unsecured environment 210 until the secure environment 202 needs to access the data 206 and/or 208 for another trade or order. Once the secure environment 202 requests access to the updated client data 206 and/or 208, the data 206 and/or 208 can be read back to the secure environment 202.

Figure 3:
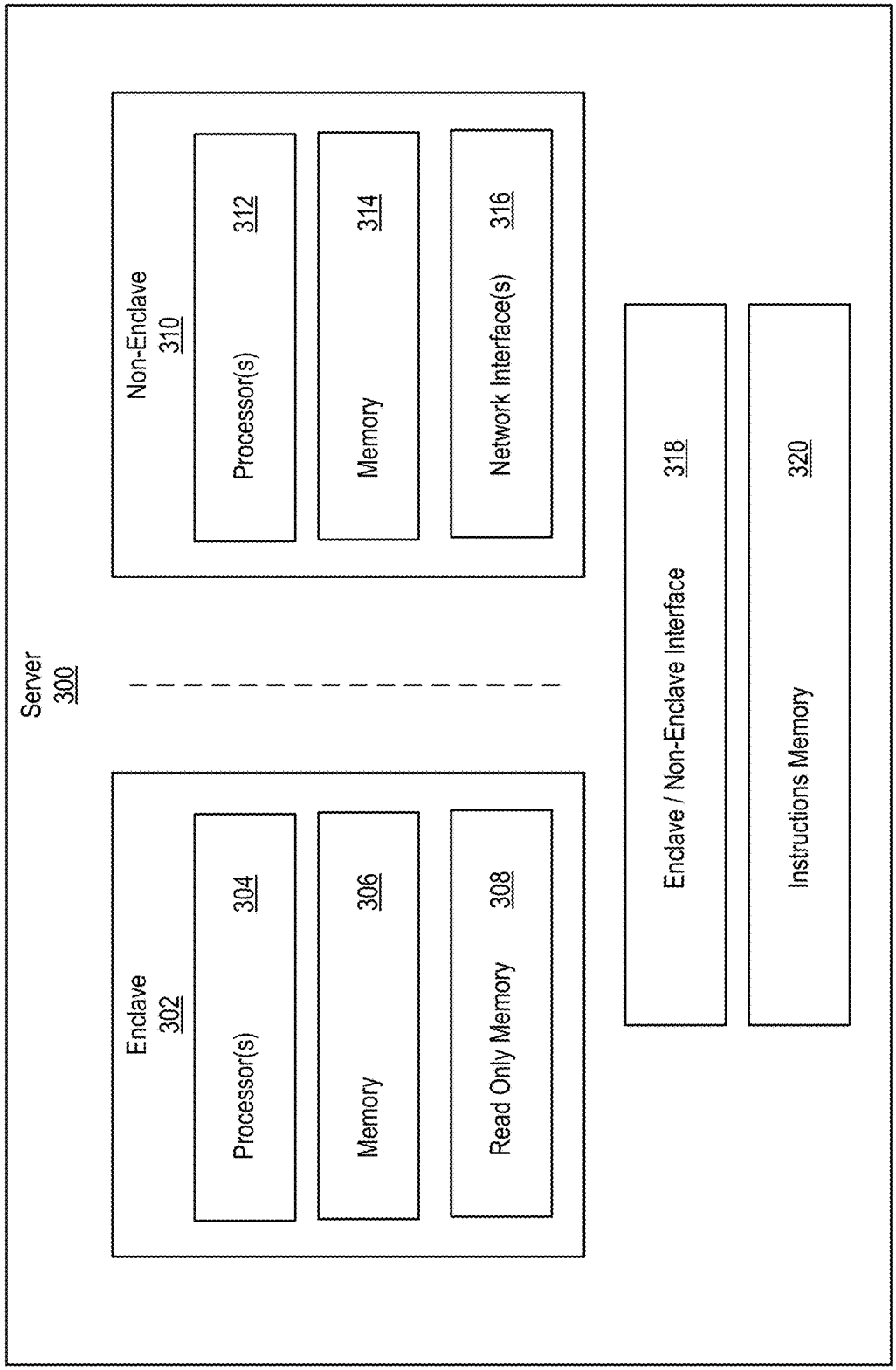
FIG. 3 is a system diagram of an example of hardware that can house an enclave crossing network.

FIG. 3 is a system diagram of an example of hardware that can house an enclave crossing network. Server 300 includes both an enclave 302 and a non-enclave 310 (e.g., refer to the secure environment 202 and the unsecured environment 210 in FIG. 2). The enclave 302 can include one or more processors 304, memory 306, and read only memory 308. The non-enclave 310 can include one or more processors 312, memory 314, and one or more network interfaces 316. The server 300 additionally includes an enclave/non-enclave interface 318 and instructions memory 320, both of which can be accessed by the enclave 302 and the non-enclave 310.

Referring to the enclave 302, the processors 304 are configured to perform instructions for operating software (e.g., the enclave crossing network software) and storing data. The memory 306 is configured to be inaccessible by the processors 312 of the non-enclave 310 but accessible by the processors 304 of the enclave 302. This is advantageous to ensure security and confidentiality of data that is being accessed and/or manipulated by the enclave 302 when performing client requests. Entities or users outside of the enclave 302 cannot look into the enclave 302. This prevents hackers from targeting the enclave 302 and it also ensures that entities, operators, or other users do not try to manipulate or prevent fair trading in the enclave 302. When settling a transaction and/or transferring assets between different client accounts in the enclave 302, client data is temporarily brought into memory 306. There, and according to instructions performed by the processors 304, the data can be validated, decrypted, updated based on the client request(s), and encrypted before being sent out of the enclave 302 for storage in the memory 314 of the non-enclave 310. Once the client request(s) is completed and the data is sent outside of the enclave 302 for storage, the enclave 302 erases the data that was temporarily brought into the memory 306. As a result, the enclave 302 does not maintain long-term storage and can perform operations associated with client requests and transactions faster. It will be understood that other software types will perform other functions in a similar way.

The read only memory 308 is configured to store an encryption key. The encryption key is only known and accessible by the enclave 302. Since the key is stored in the read only memory 308, the encryption key cannot be modified, even by an operator of the enclave 302. The same encryption key is used by the enclave 302 to (1) encrypt and decrypt original data that is stored in the non-enclave 310 and brought into the enclave 302 and (2) encrypt and decrypt data that is updated in the enclave 302 and sent to the non-enclave 310 for storage. Using the same, unmodifiable encryption key is advantageous to ensure that data is not altered or manipulated while in storage in the memory 314 of the non-enclave 310. The read only memory 308 is also inaccessible by the processors 312 of the non-enclave 310 while being accessible by one or more of the processors 304 of the enclave 302. This is advantageous for the reasons mentioned above and can also allow the operator to make a credible statement that, even if they were motivated to do so, they lack even the ability to tamper with software running in the enclave 302.

Referring to the non-enclave 310, the processors 312 are configured to perform operations within the non-enclave 310, in response to receiving requests or instructions from the enclave 302. The memory 314 stores encrypted data objects (e.g., refer to the unsecured memory 212 and the client data 206 and 208 in FIG. 2). As a result, the encrypted data objects associated with clients is not stored in the enclave 302, but rather is encrypted by the enclave 302, stored remotely in the non-enclave 310, and requested and accessed by the enclave 302. The memory 314 is further configured to permit access by one or more processors 304 of the enclave 302. Finally, the network interfaces 316 provides for communication between one or more of the components described herein. In other examples, some elements may reside in remote machines. For example, the server 300 may use remote data storage to augment or replace the memory 314.

Network interfaces 316 provide the server 300 with access to one or more data networks. For example, the network interfaces 316 may provide access to remote devices over local networks, the Internet, etc. This may include, for example, high-bandwidth connections with other devices in the same data-center, on the same server rack, etc.

The enclave/non-enclave interface 318 provides for read and write permissions to both the enclave 302 and the non-enclave 310. The interface 318 also provides for communication between the enclave 302 and the non-enclave 310.

The instructions memory 320 is configured to store instructions that, when executed by the enclave processors 304 cause the processors 304 to perform one or more of the operations and/or processes. The instructions memory 320 can store source code for a crossing network that runs on the server 300. The non-enclave 310, therefore, can have write permissions since the non-enclave 310 gets the source code from an external source outside the server 300. The non-enclave 310 can have optional read permissions for the instructions memory 320. The enclave 302 can have read permissions for the instructions memory 320. The enclave 302 needs to read instructions for running and operating the crossing network. The enclave 302 can have optional write permissions since the enclave 302 is not in charge with writing the source code.

Figure 4A:
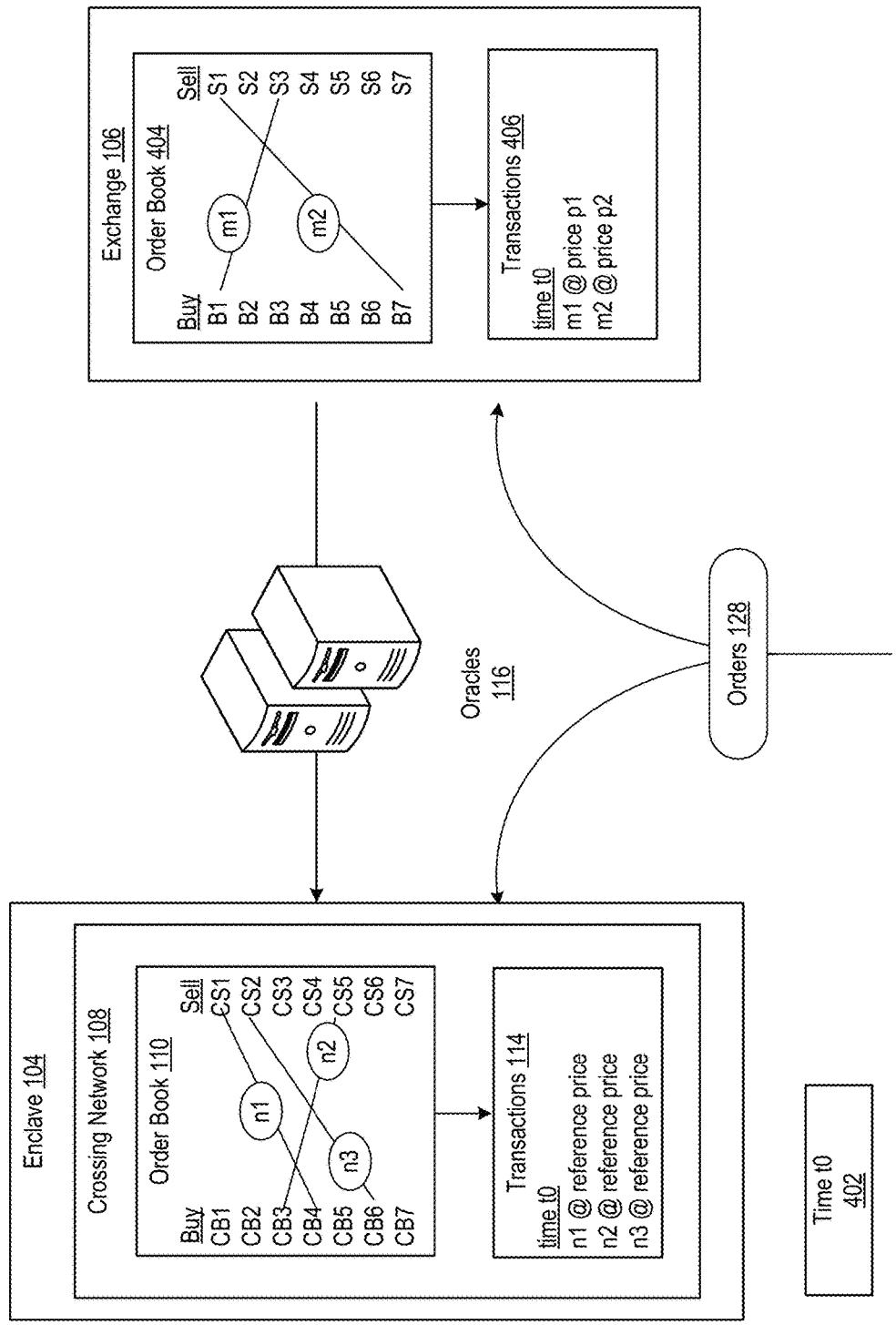
FIGS. 4A-C are conceptual diagrams of an example process for transferring blockchain assets in a crossing network using the techniques and systems described herein.
Figure 4B:
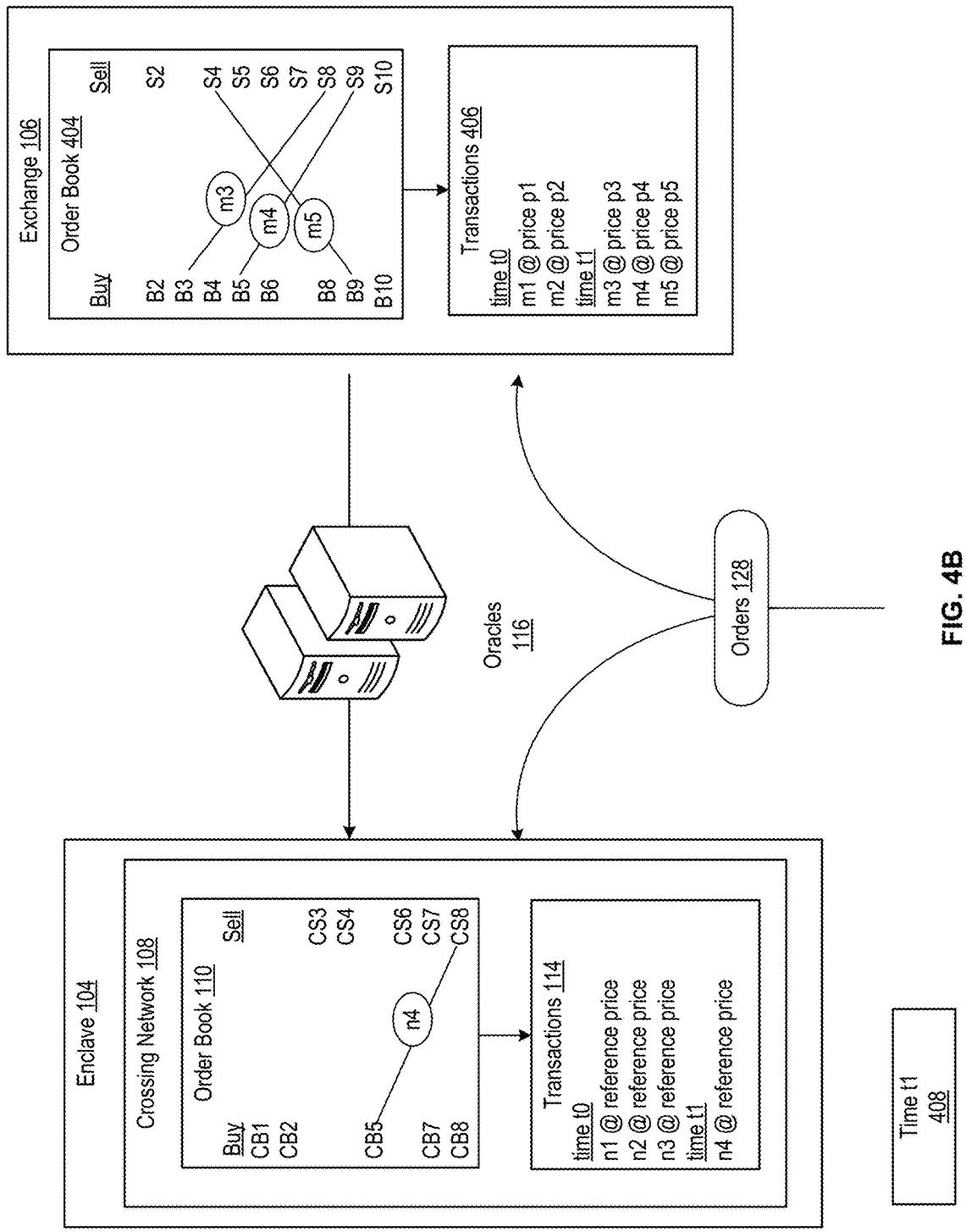
Figure 4C:
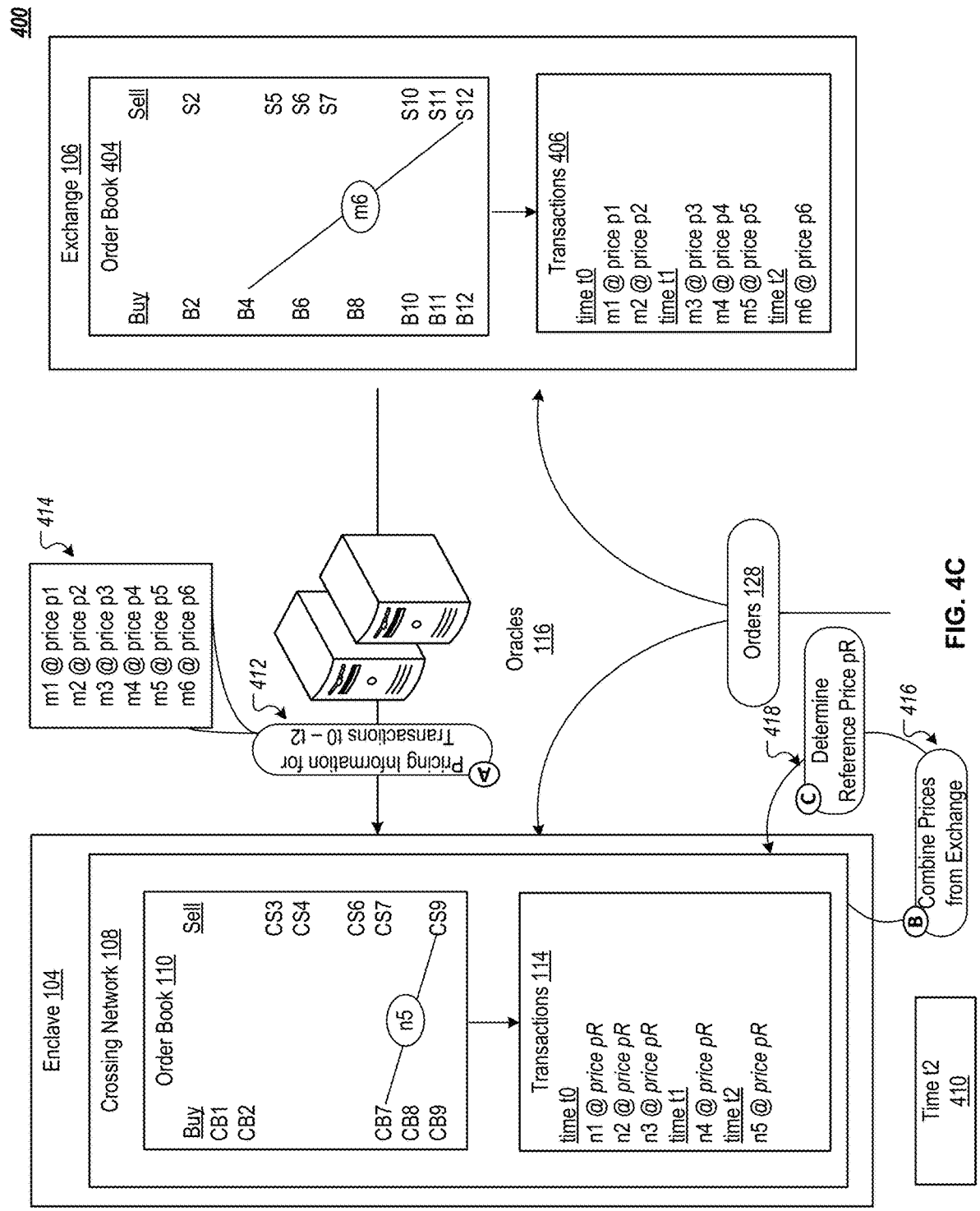

FIGS. 4A-C are conceptual diagrams of an example process 400 for transferring blockchain assets in a crossing network using the techniques and systems described herein. The example process 400 can be performed by any of a variety of appropriate crossing networks and enclave computing environments, such as the crossing networks and enclaves described above with regard to FIGS. 1, 2, and/or 3. The components from the system 100 are depicted as performing the process 400, but other computing environments and components are also possible.

Referring to FIG. 4A, at time t0 (402) the order books 110 and 404 for the crossing network 108 and exchange 106, respectively, are populated with orders 128 from clients. The orders 128 submitted to the crossing network 110 can be different from the orders submitted to the exchange 106, but they can relate to the same asset-pairs that are being traded within both order books 110 and 404. The order books 110 and 404 depict simplistic orders requests to "buy" and "sell" a particular asset, which can be paired in each of the order books against another currency as part of the asset-pair transfers. The "buy" and "sell" are simply provided for illustrative purposes to show order requests on opposing sides of an asset-pair transaction—other configurations and structures for order requests are also possible. In the depicted example, at time t0 the order book 404 in the exchange 106 matches and fills two orders, represented by m1 and m2. These transactions are reflected in the transaction log 406 for the exchange 106, along with the corresponding asset-pair prices for the transactions. Similarly, the order book 110 matches three order requests, represented by n1, n2, and n3, which are reflected in the transaction ledger 114 for the crossing network 108. The transactions 114 for the crossing network 108 are depicted, however, as being filled at a reference price, which is determined based on contemporaneous pricing for the transactions from the exchange 106 at or around time t0 (402). In this example, the reference price for the current time t0 (402) may not yet be determined at the time of filling the orders, and may instead be retroactively determined based on a transactions occurring over a period of time that includes time to.

Referring to FIG. 4B, at a subsequent time t1 (408), additional order requests are received into each of the order books 110 and 404, and additional matches are made (e.g., matches m3-m5 and n4). Again, the pricing information for the matches in the exchange 106 are determined at the time of filling, whereas the matches in the crossing network 108 can be designated as a reference price that will be determined for the time t1, which in this example is considered to be within the same time period as the time t0.

Referring to FIG. 4C, at a subsequent time t2 (410), more order requests are received into each of the order books 110 and 404, and more matches are made (e.g., matches m6 and n5). As depicted in this example, the oracles 116 obtain and provide the pricing information 414 for transactions settled in the exchange 106 for the time period t0-t2 (step A, 412). The oracles 116 may gather and provide the pricing information in batches over time periods, as depicted in this example, and/or they may provide a stream of pricing information as it becomes available on the exchange 106. Additionally, the oracles 116 may provide raw pricing and transaction information (e.g., price, quantity, and timestamp for each individual transaction) and/or it may provide aggregations of pricing information (e.g., average pricing information, median pricing information, standard deviation of transaction price). Other configurations of obtaining and providing pricing information to the crossing network 108 are also possible.

The crossing network 108 can combine the pricing information from the exchange (step B, 416) and use the combined pricing information to determine a reference price pR for the filled orders over times t0-t2 (step C, 418). Combining the pricing information can include any of a variety of operations, such as sorting the pricing information, removing one or more outlier prices, weighting pricing information based on various factors (e.g., quantity of currency transacted), and/or other operations. The reference pricing can be determined based on the combined pricing information, such determining median prices, determining mean prices, combining with reference prices for one or more previous time periods, and/or other statistical operations on the set of combined pricing information that is received from the pricing oracles 116. The reference price can be applied to transactions filled during the corresponding time period for the reference price, as depicted in the transactions 114. The reference price can be determined on a recurring basis, such as every second, minute, hour, day, or other appropriate time interval. The reference price may be influenced by previous reference prices and/or may be determined for overlapping time intervals, as well, which can permit for a more blended reference pricing progression over time. For example, a reference price for the time t1 may be based on the pricing information from the exchanges 106 for time t1 and the adjacent time periods (time t0 and t2). In this example, a separate reference price for the time t2 may be determined based on the overlapping pricing information from time t2, and adjacent time periods (t1 and t3). Other configurations are also possible.

In some embodiments, order matching can be performed continuously, as order requests are received. For example, in response to an order request (e.g., a buy order or a sell order), the crossing network 108 can determine whether a matching order request exists in the order book 110 for the received order request (e.g., a matching order request on the opposite side of the order book), and if so, a match can be made immediately. As another example, in response to the order request, the crossing network 108 can determine whether a matching order request exists in the order book 110 for the received order request, after a predetermined delay (e.g., ten seconds, a minute, five minutes, or another suitable amount of time). As another example, in response to the order request, the crossing network 108 can determine whether a matching order requests exists in the order book 110 for the received order request, after a randomized delay period.

In some embodiments, order matching can occur periodically. For example, as order requests are received by the crossing network 108, the order requests can be pooled until such time that a matching process is to be initiated. When the matching process is initiated, for example, the order requests in the order book 110 can be matched in a batch of orders, according to various matching priority criteria. For example, the orders can be matched according to a sequence in which the order requests were received, with order requests that had been received first since a previous matching process (or alternately, order requests that had been received last) being given priority during a matching process. As another example, the orders can be matched according to a value of the order requests, with high-value order requests (or alternately, low-value order requests) being given priority during a matching process. As another example, the orders can be matched according to transaction fees submitted with the order requests (e.g., with orders requests having higher transaction fees being given priority), and/or according to other suitable criteria. A periodic matching process can be initiated at predetermined scheduled times (e.g., 1:00, 2:00, 3:00, etc.), at predetermined time intervals (e.g., once a minute, once every 10 minutes, once every 30 minutes, once an hour, etc.), and/or based at least in part on the outcome of a stochastic process (e.g., based on a random variable). For example, periodic matching can generally occur at regular times or time intervals, plus or minus a randomly generated number of seconds or minutes. By introducing a random element to the periodic matching process, for example, average wait times for order fulfillment can be maintained while ensuring that client devices that submit order requests are unable to anticipate exact times at which a matching process occurs—thus avoiding scenarios in which prices at external exchanges may be manipulated at particular times to achieve favorable order fulfillment conditions for submitted order requests.

In some embodiments, a determination can be performed of whether a received order request meets a threshold minimum value, before adding the order request to an order book. In embodiments in which order matching is performed continuously, for example, client devices may discover a prevailing market sentiment by submitting an order request. An immediately fulfilled order request may indicate that matching orders exist on the other side of the order book 110, whereas an order request that is not immediately fulfilled may indicate that such order requests do not exist. Since such market sentiment information can be valuable (and can potentially be exploited), by setting a minimum value for order requests, probing of the crossing network 108 for the information by client devices can be discouraged.

In some embodiments, order requests can include transaction fees for processing the requests. When submitting an order request, for example, a client device can provide information that specifies a flat or percentage fee for matching the order request. When matching the order request, for example, the crossing network 108 can withdraw the specified transaction fee from an account associated with the client device and can deposit the fee in an account associated with the crossing network. In some implementations, a transaction fee can be used as a preference criterion when matching orders. For example, if multiple different order requests are on the same side of the order book 110 (e.g., buy orders or sell orders), the orders can be matched according to a value of the transaction fee (e.g., a flat or percentage value), with orders associated with higher-value fees being matched first. In some implementations, a transaction fee can be specified or adjusted by a client after initially submitting an order request. For example, after a client device initially submits a buy order request having at least a threshold minimum value (e.g., $100 or another suitable amount) with a minimum transaction fee (e.g., 1% or another suitable amount), the client device can receive information related to other order requests in the order book 110. In the present example, another order request on the same side of the order book 110 (e.g., another buy request) has a same transaction fee (e.g., 1%). Optionally, the client device can submit a transaction fee adjustment (e.g., raising the transaction fee to 2% or another suitable amount), so that the submitted order request may be preferentially matched before other competing order requests.

Although not depicted, the exchange 106 and/or the oracles 116 may additionally or alternatively be executed within secure enclave environments, in addition to the crossing network 108. For example, the oracles 116 may each be executed within a secure enclave that is separate from (or part of) the enclave 104. Similarly, the exchange 106 may be provide within a secure enclave, as well. The secure enclaves used for the exchange 106 and/or the oracles 116 can provide security and establish trust that the operations performed by these systems are authentic and have not be modified/altered by malicious actors. Additional components of the systems described throughout this document, such as adjudicators, can also be executed within secure enclaves.

Figure 5:
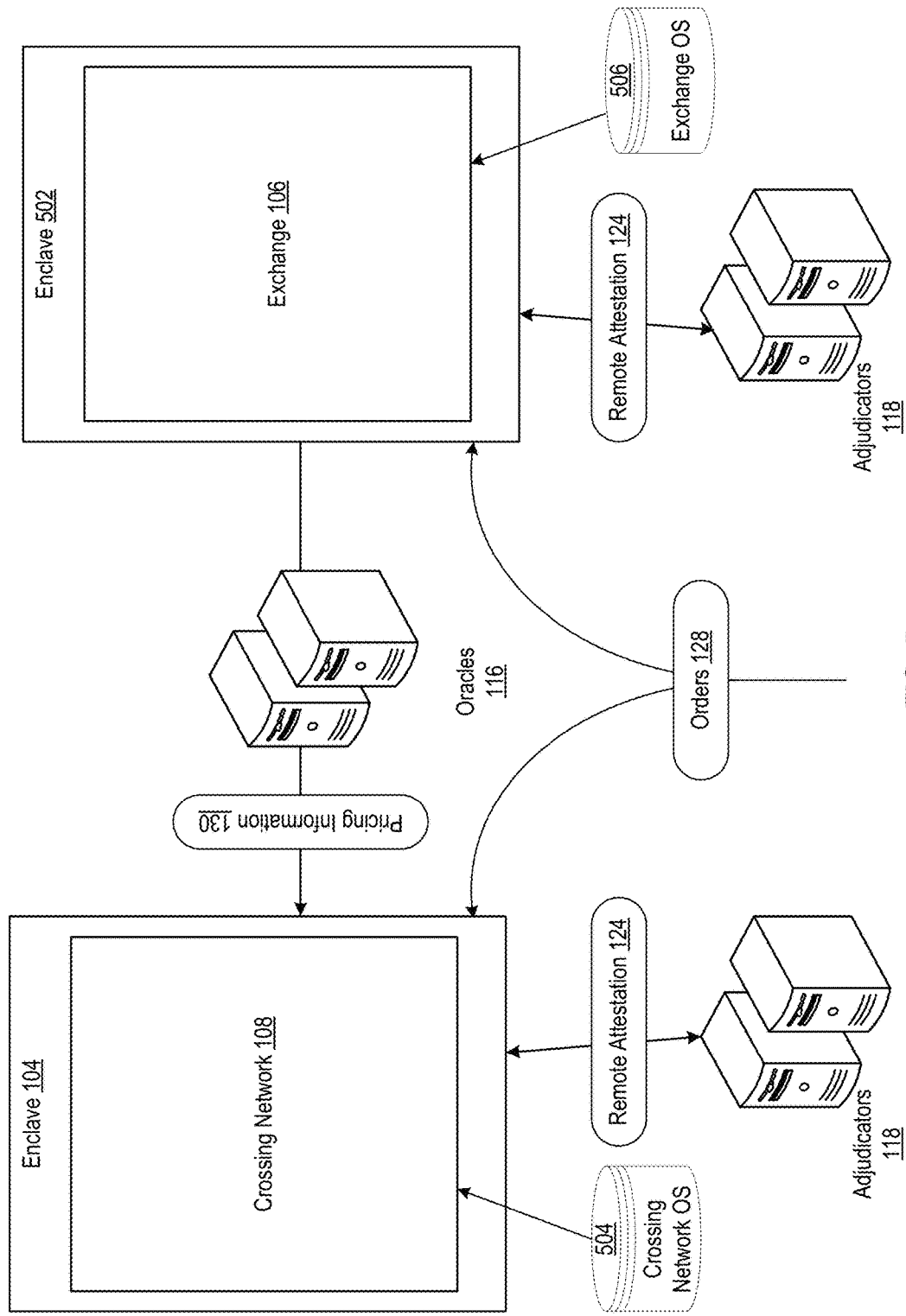
FIG. 5 is a conceptual diagram of an example system including a crossing network running in a secure enclave and an exchange running in a secure enclave.

FIG. 5 is a conceptual diagram of an example system 500 including a crossing network running in a secure enclave and an exchange running in a secure enclave. The example system 500 can be provided by any of a variety of appropriate crossing networks and enclave computing environments, such as the crossing networks and enclaves described above with regard to FIGS. 1, 2, and/or 3. The components from the system 100 are depicted as being part of system 500, but other computing environments and components are also possible.

The example system 500 shows an example environment in which the crossing network 108 and the exchange 106 are executed in separate enclaves 104 and 502, respectively. In this example, the enclave 104 loads and runs a crossing network operating system (or codebase) 504 into its secure computing environment to provide the crossing network 108, which can be authenticated and validated by one or more adjudicators 118 through remote attestation. Similarly, in this example, the enclave 502 loads and runs an exchange operating system (or codebase) 506 into its secure computing environment to provide the crossing network 108, which can be authenticated and validated by one or more adjudicators 118 (which may be the same as or different from adjudicators used with the crossing network 108) through remote attestation.

Figure 6:
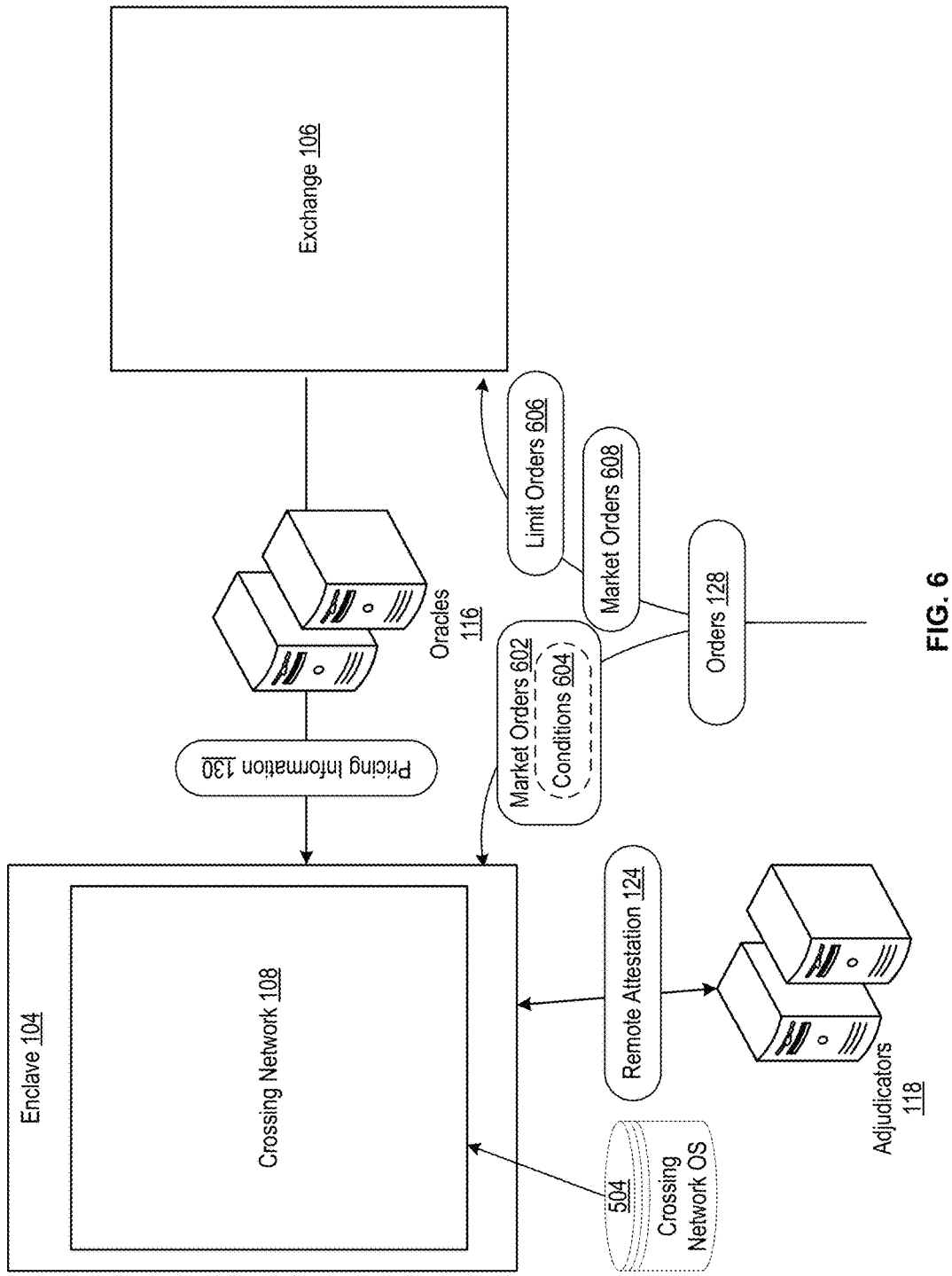
FIG. 6 is a conceptual diagram of an example system for filling orders within a crossing network running in a secure enclave environment and an exchange that influences market pricing within the secure enclave.

FIG. 6 is a conceptual diagram of an example system 600 for filling orders within a crossing network running in a secure enclave environment and an exchange that influences market pricing within the secure enclave. The example system 600 can be provided by any of a variety of appropriate crossing networks and enclave computing environments, such as the crossing networks and enclaves described above with regard to FIGS. 1, 2, and/or 3. The components from the system 100 are depicted as being part of system 600, but other computing environments and components are also possible.

The example system 600 depicts different types of orders which may be supported and filled in the order books of the exchange 106 and the crossing network 108. In the depicted example, the exchange 106 may permit clients to submit limit orders 606, which can specify an asset quantity and a fill price for an asset-pair supported within the exchange, as well as market orders 608, which may specify only an asset quantity for the order. Limit orders 606 can match against order requests on an opposing side of the asset-pair for the exchange 106 that at least meet the fill price (or better) for the limit order. Market orders 608 can match against an order request on an opposing side of the asset-pair for the exchange 106 that has a next best price for the limit order party.

The crossing network 108 may permit market orders 602 to be matched against each other, where the price is determined based on contemporaneous pricing information from the exchange 106. The crossing network 108 may support optional conditions 604 for the market orders 602, as well. The conditions 604 can specify various conditions that may be required for the market orders 602 to be matched and alive within the order book for the crossing network 108, such as a duration for the orders 602, exchange market conditions (e.g., volume, volatility, market participation, pricing trends), and/or other conditions. Even with the conditions 604, the market orders 602 can be settled based on reference prices that are determined by the crossing network 108 based on pricing information from the exchange 106.

Figure 7:
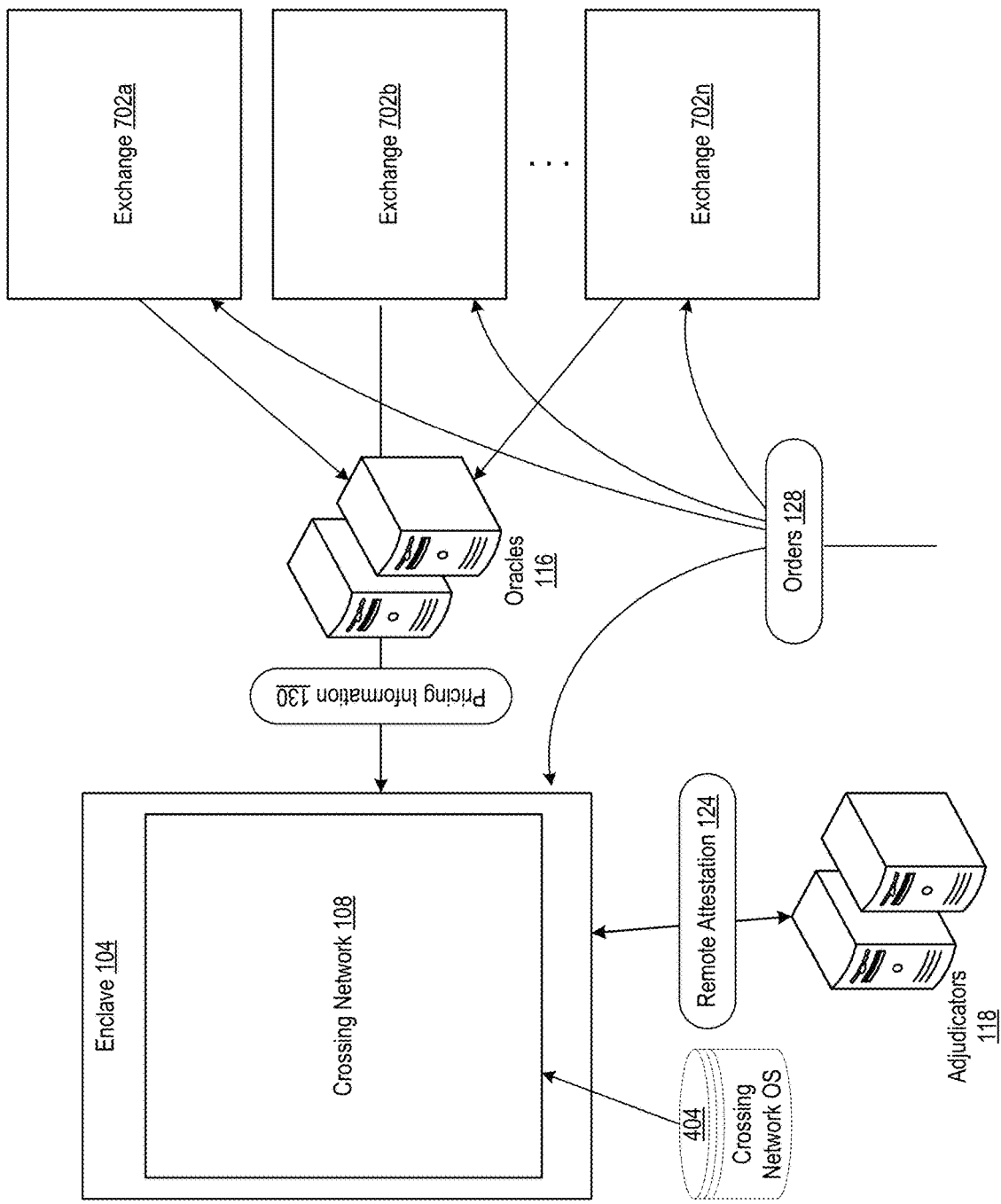
FIG. 7 is a conceptual diagram of an example system including a crossing network running in a secure enclave and multiple exchanges.

FIG. 7 is a conceptual diagram of an example system 700 including a crossing network running in a secure enclave and multiple exchanges. The example system 700 can be provided by any of a variety of appropriate crossing networks and enclave computing environments, such as the crossing networks and enclaves described above with regard to FIGS. 1, 2, and/or 3. The components from the system 100 are depicted as being part of system 700, but other computing environments and components are also possible.

The example system 700 shows an example in which multiple different exchanges 702*a-n* are used to provide pricing information 130, which is used by the crossing network 108. The exchanges 702*a-n* can each support order books for the same asset-pair that is traded within the crossing network 108. The pricing information from each of these different exchanges 702*a-n* can be combined and used to determine reference pricing for the crossing network 108. In some instances, the crossing network 108 may support multiple different asset-pairs to be traded, in which case the exchanges 702*a-n* may support different asset-pair trades and provide different asset-pair pricing information to the crossing network 108.

FIGS. 8A-E are diagrams of example processes 800, 830, 850, 860, and 870 for transferring assets into and filling orders within a crossing network based on market pricing information from an exchange. The example processes 800, 830, 850, 860, and 870 can be performed by any of a variety of appropriate crossing networks and enclave computing environments, such as the crossing networks and enclaves described above with regard to FIGS. 1, 2, and/or 3. The components from the system 100 are depicted as performing the processes 800, 830, 850, 860, and 870 but other computing environments and components are also possible.

Figure 8A:
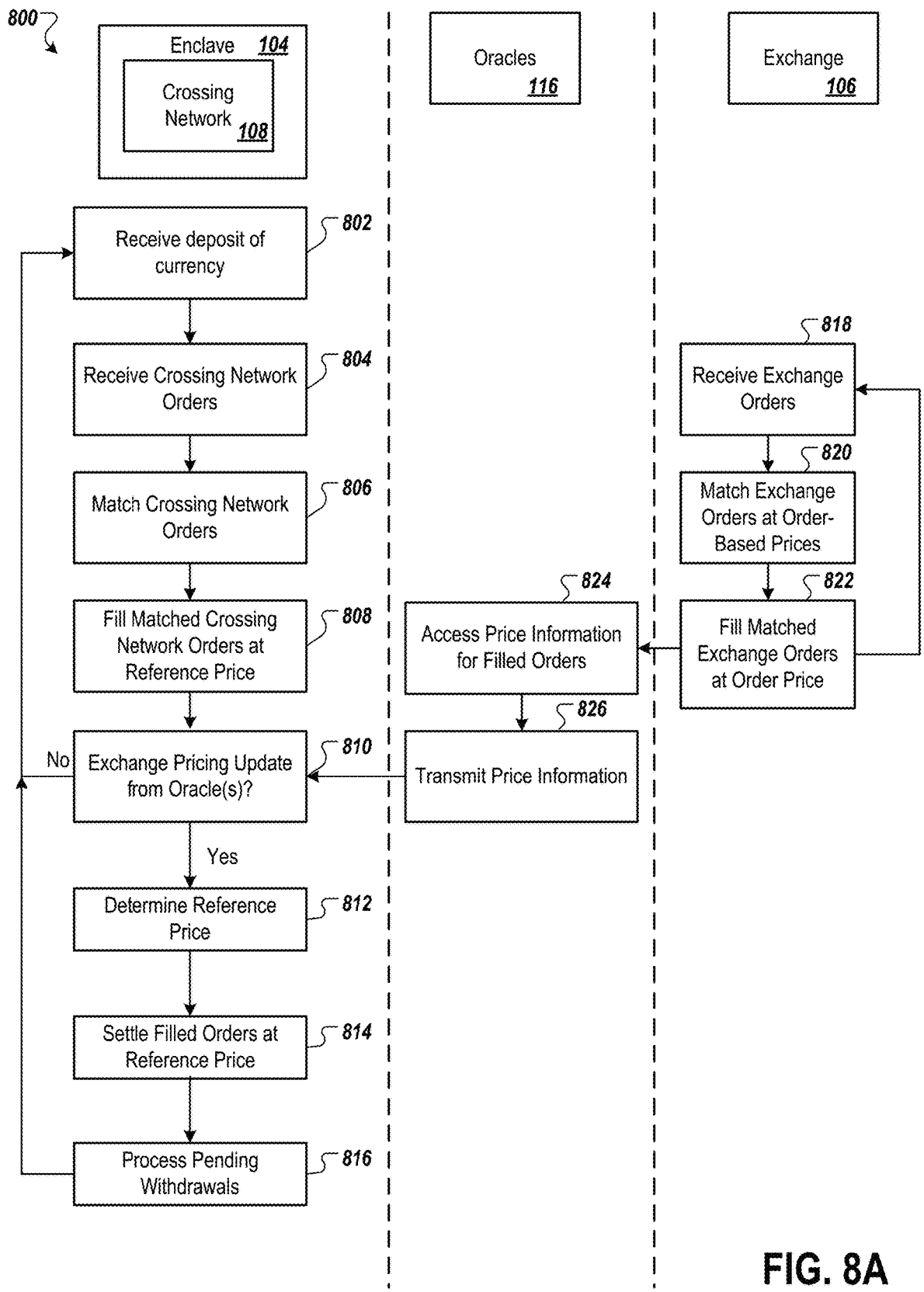
FIGS. 8A-E are diagrams of example processes for transferring assets into and filling orders within a crossing network based on market pricing information from an exchange.

Referring to FIG. 8A, which is a swimlane diagram of the example process 800 for transferring assets into and filling orders within a crossing network based on market pricing information from an exchange, the process 800 includes the crossing network 108 receiving a currency deposit (802). The receipt of the deposit can cause account balances for corresponding accounts maintained within the crossing network 108 to be updated to reflect the deposits. Crossing network orders can be received by the crossing network (804), such as receiving crossing network orders from the client devices 120. The received crossing network orders can be added to an order book and matched with each other (806). For example, the crossing network orders 126 can be added to the order book 110 and matched against each other. Matching orders can be filled at a reference price for the time period within which the orders were matched (808). The reference price can be determined based on prices for filled orders for corresponding asset-pair trades within the exchange 106, as described below. The reference price can be continually updated based on pricing information from the exchange 106, as provided by pricing oracles 116. A determination can be made as to whether exchange pricing updates have been received from the oracles 116 (810). In the event that pricing updates have not been received, the steps 802-810 can be repeated. If pricing updates have been received (and/or if a timer associated with reference price updates has expired since a previous update), then a reference price can be determined (812) and filled orders can be settled at the reference price (814). An example process for determining the reference price is described below with regard to FIG. 9. If pending withdrawal requests have been received, they can be processed once the filled orders have been settled (816).

In parallel with the crossing network 108 order matching, the exchange 106 can receive orders (818), match orders within the exchange order book (820), and fill matched exchange orders at prices that are determined for each matched order (822), which may include a limit price included in a limit order. The oracles 116 can access price information for the filled orders (824) and can transmit the price information to the crossing network (826), which can receive the pricing information at step 810.

Figure 8B:
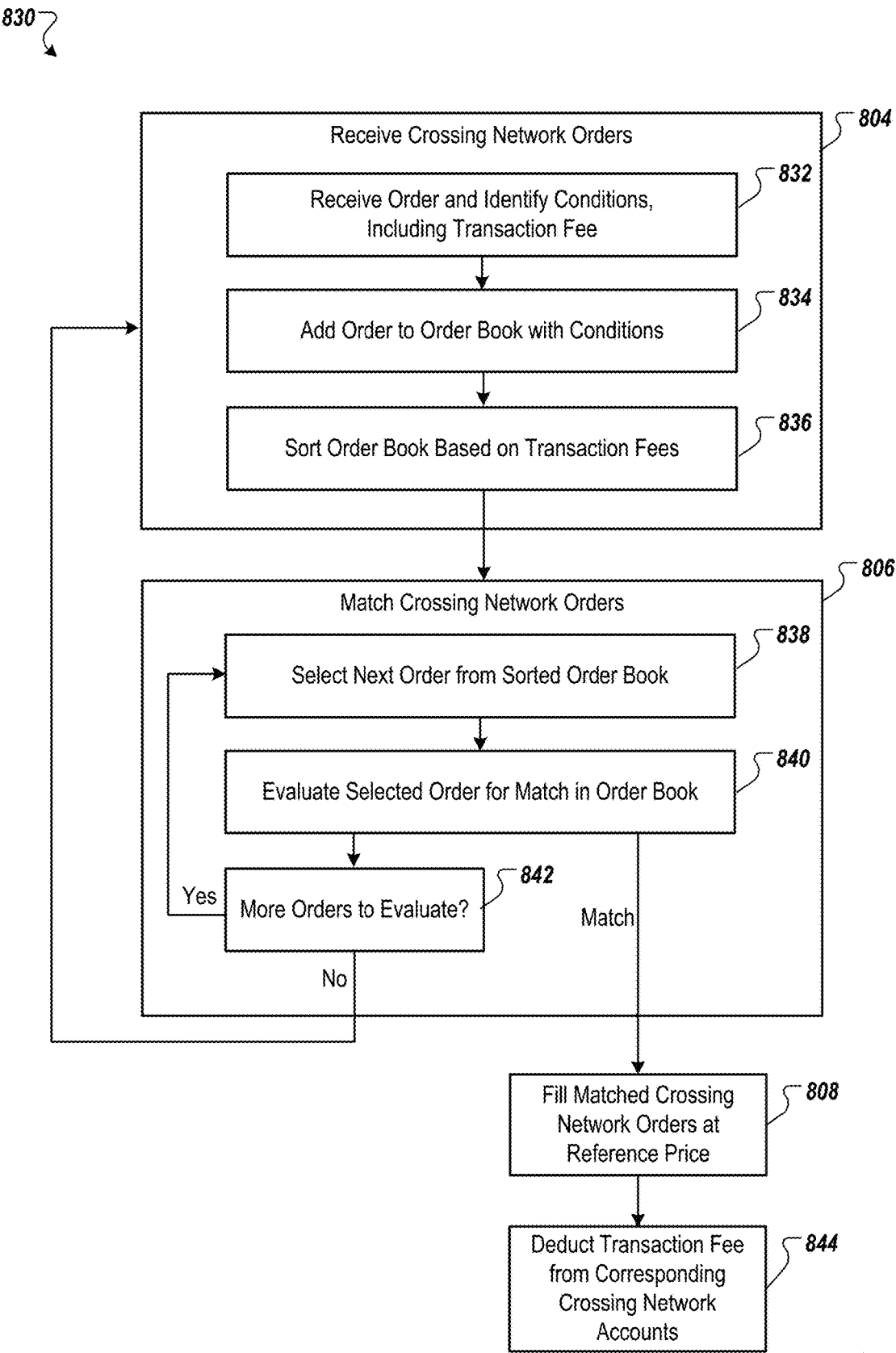

Referring to FIG. 8B, the example process 830 includes additional substeps that can be part of the process 800 that is performed by the crossing network 108. In particular, the example process 830 depicts example substeps related to when matching is performed relative to receiving and adding crossing network orders to the order book, sorting orders within the order book based on transaction fees, and evaluating orders within the order book for matches based on order sequences/prioritization provided by the sorted order book.

For example, as part of receiving crossing network orders (804, described above), an order can be received and conditions for the order can be identified (832). For example, conditions for an order can include any of a variety of conditions described throughout this document, such as price ranges, a time-to-live for the order, and others, as well as transaction fees. The transaction fees can be specified in any of a variety of ways, such as a flat fee, a percentage of the overall transaction, and/or combinations thereof. The fees may include a floor/minimum fee (i.e., default fee), which clients may elect to exceed for their orders. For example, clients placing orders may designate fees for individual orders, which may permit for clients to prioritize the evaluation and matching of their orders with the payment of enhanced/increased fees.

The received order can be added to the order book with its conditions, including transaction fees (834). The orders in the order book can be sorted based on transaction fees (836). For example, an order with a greatest designated transaction fee among the pending orders in the order book can be ranked first within a sequence of orders provided by the sorted order book. As a result, when individual orders are evaluated for matching within the order book, the first ranked order can be evaluated first when crossing occurs and, as a result, can have an opportunity to match against all available orders on an opposing side of the transaction. In contrast, a lowest ranked order in the sorted order book (order with a lowest transaction fee) may have fewer possible transactions within the order book to match against if matches are made by the orders ranked above it in the sorted order book (i.e., matched orders can be removed from the order book to prevent multiple matches of a single order).

In the depicted example process 830, continuous crossing can be performed as orders are received and added to the order book, as indicated by the process 830 progressing from step 836 to matching the crossing network orders (806)—meaning that the matching 806 is performed in response to each order that is received. As part of the matching 806, a next (or first) order in the sequence of orders provided by the sorted order book can be selected (838). The selected order can then be evaluated, using its conditions as well as conditions for other orders in the order book, to determine whether any matches of orders on an opposing side of the selected order's transaction exist within the order book (840). Matches that are identified can proceed to being filled at the reference price (808), as described above, and transaction fees associated with the matched and filled orders can be deducted from corresponding crossing network accounts for the clients who placed the matching orders (844). This process can repeat for each order in the order book (842), with orders being evaluated sequentially according to their sorting within the order book based on their associated transaction fees. Once all of the orders in the order book have been evaluated for matches, crossing network orders can be received (804) and the process can repeat.

Figure 8C:
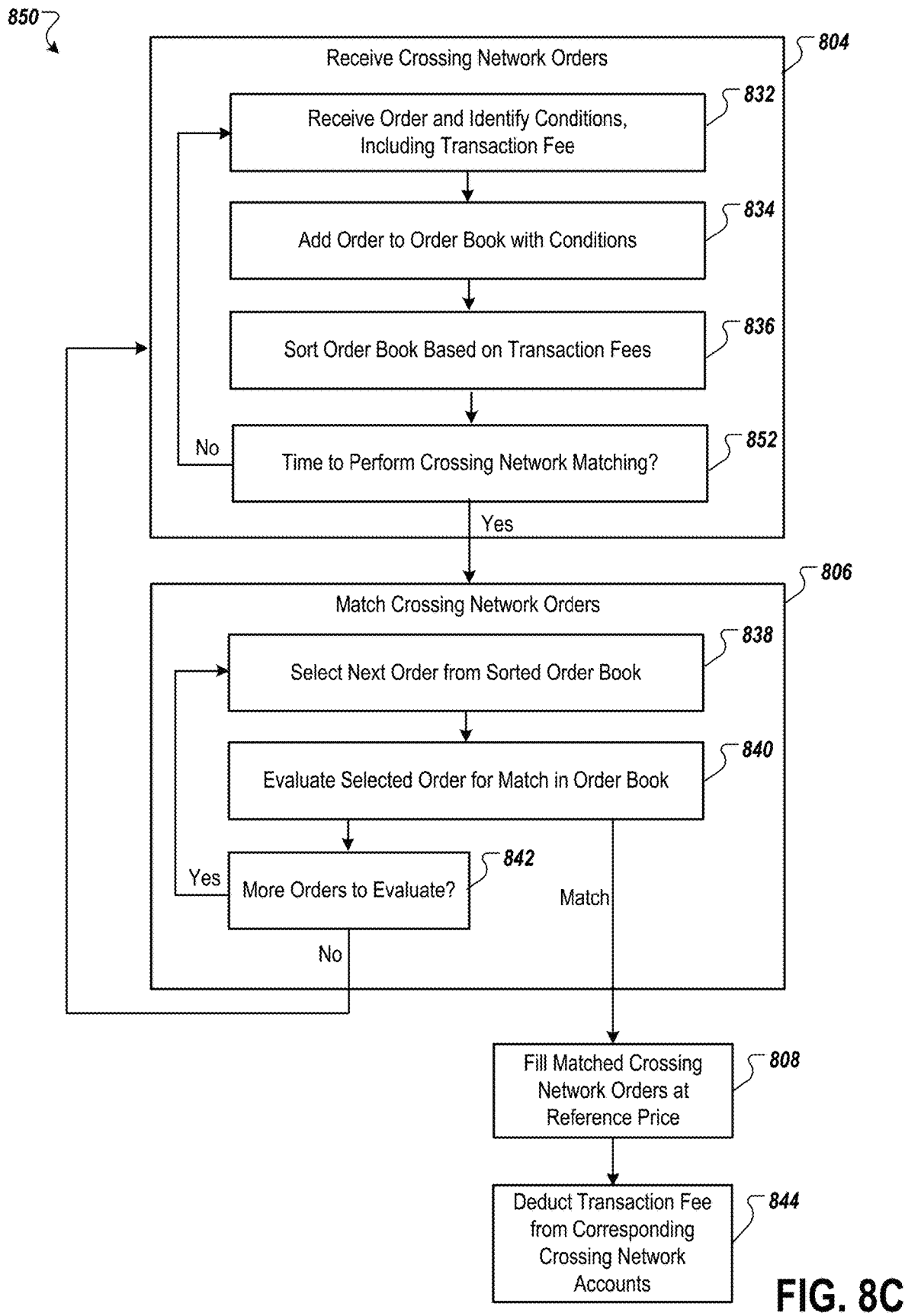

Referring to FIG. 8C, the example process 850 is similar to the process 830, but with periodic crossing/matching instead of continuous matching, which is described above with regard to process 830 and FIG. 8B. In this example process 850, the same steps 832-836 described above are performed as part of step 804, but an additional evaluation of whether it presently time to perform crossing network matching (852). The determination of whether it is time to perform matching can be performed in any of a variety of ways, such as based on predetermined times for matching (e.g., match at scheduled times during day), based on time intervals (e.g., match every $\tau$ seconds), and/or based on a varied time interval (e.g., time interval dynamically selected based on outcome of stochastic process, such as poisson dice roll). For example, a varied time interval may change in unpredictable ways (or not at all) between iteration of the process 850, which can provide temporal crossing unpredictability, which can deter and thwart crossing network participants who may be attempting to probe or otherwise game the crossing network market. However, the crossing network may, across a population of the varied time intervals, seek to achieve an average (or other statistical metric) time interval to provide assurances as to the general crossing network behavior while still shielding the market in its present state from manipulation or other gamesmanship. Other configurations for providing temporal unpredictability can additionally be used, such as continuous crossing (i.e., process 830), which can cross at time intervals dictated by the receipt of orders, which may be irregular and unpredictable across a sufficiently large pool of market participants. Additionally, as noted above, to avoid potential gamesmanship by submitting a stream of orders to probe the crossing network, the number of orders that clients can submit over a period of time (e.g., minute, hour, day, week) and/or have pending within the crossing network at a given time may be limited.

The remainder of the process 850 can proceed similarly to the process 830, as described above.

Although sorting and ranking orders within the order book in processes 830 and 850 is described with regard to associated transaction fees, additional and/or alternate features can be used to rank and sort the orders within the order book for evaluation.

Figure 8D:
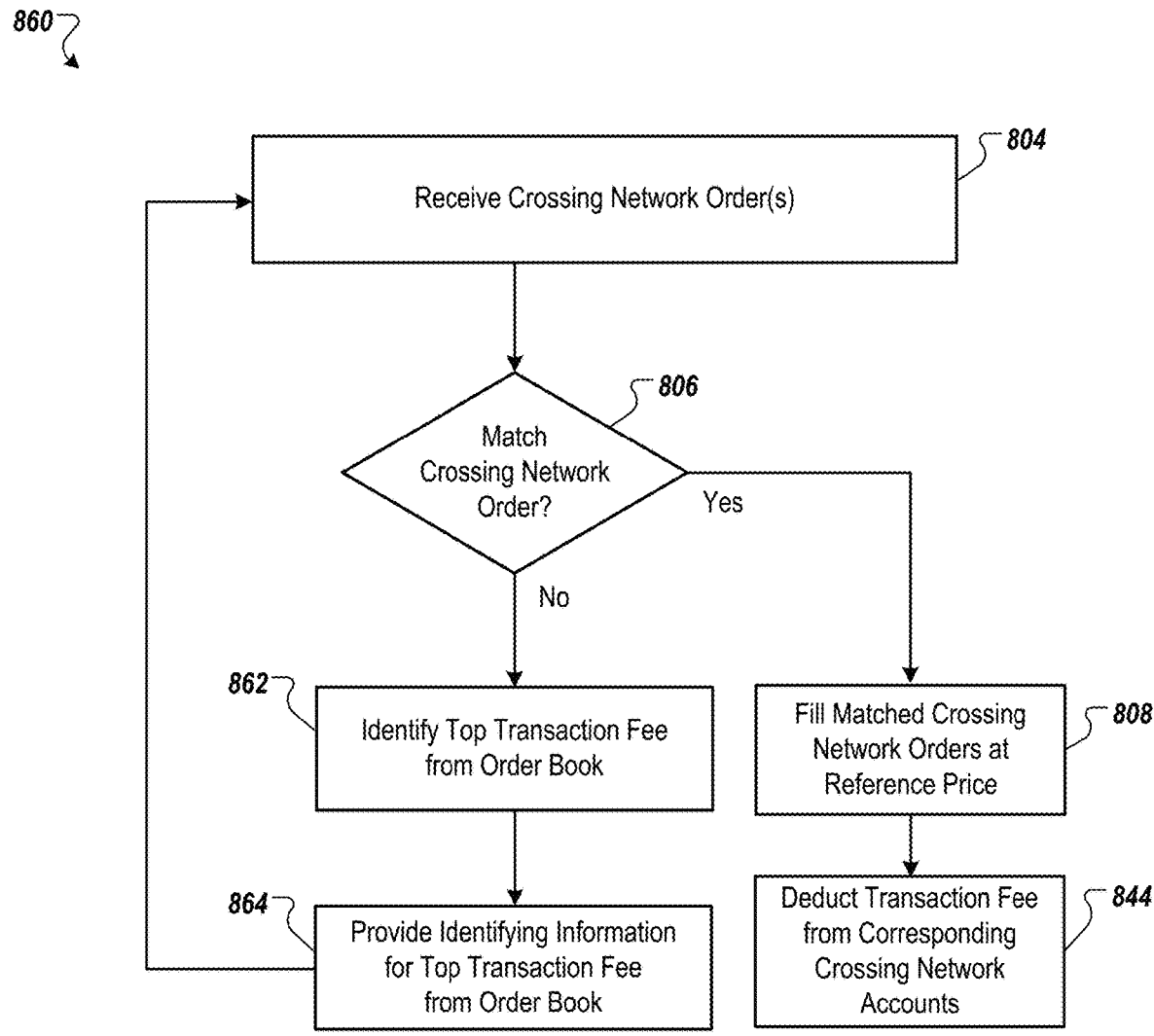

Referring to FIG. 8D, the example process 860 is similar to the processes 830 and 850, but with additional steps related to identifying top transaction fees and providing identifying information for the top transaction fees when adding crossing network orders to the order book. For example, after receiving a crossing network order (804, described above) for which a transaction fee has been designated, the received order can be added to the order book with its fee (and optionally, other specified conditions).

The received crossing network order may potentially be matched with a corresponding order on an opposing side of the order book, based on an evaluation of the designated fee (and optionally, other specified conditions) relative to other orders in the order book. If a match is found for the received crossing network order, for example, the order can be filled at the reference price (808), as described above, and transaction fees associated with the matched and filled order can be deducted from corresponding crossing network accounts for the clients who placed the matching orders (844).

However, if a match is not found for the received crossing network order (e.g., a match is not immediately found in a continuous matching scenario, or a match is not found in a periodic matching scenario), a top transaction fee can be identified (862) from the order book. The top transaction fee, for example, can be the highest flat fee and/or percentage fee submitted with a crossing order that is currently waiting to be matched with another crossing order, and that exists on the same side of the order book as the received crossing network order. As another example, the top transaction fee can be the highest fee submitted with a crossing order on either side of the order book.

Identifying information can be provided for the top transaction fee from the order book (864). For example, the client device that submitted the unmatched crossing network order can receive information that indicates the current top transaction fee in the order book. The identifying information can include the transaction fee information with or without additional order information (e.g., an amount of the order, a time-to-live for the order, a price range of the order, etc.). Based on the information that identifies the top transaction fee, for example, a user of the client device can optionally modify and/or resubmit the crossing order (804) with an increased transaction fee, such that the transaction fee of the crossing order equals or exceeds that of other orders in the order book. By increasing the transaction fee for the crossing network order, for example, the order's position in a matching queue can be improved so that the order will potentially be matched more quickly than other orders in the order book. In some implementations, a range of transaction fees can be specified for a crossing network order, including an initial fee and a maximum fee. For example, if a match is not initially found for a crossing network order (e.g., the order is not immediately filled, or is not filled during a matching period), the transaction fee for the order can be automatically increased up to the specified maximum fee to improve the order's position in the matching queue.

Figure 8E:
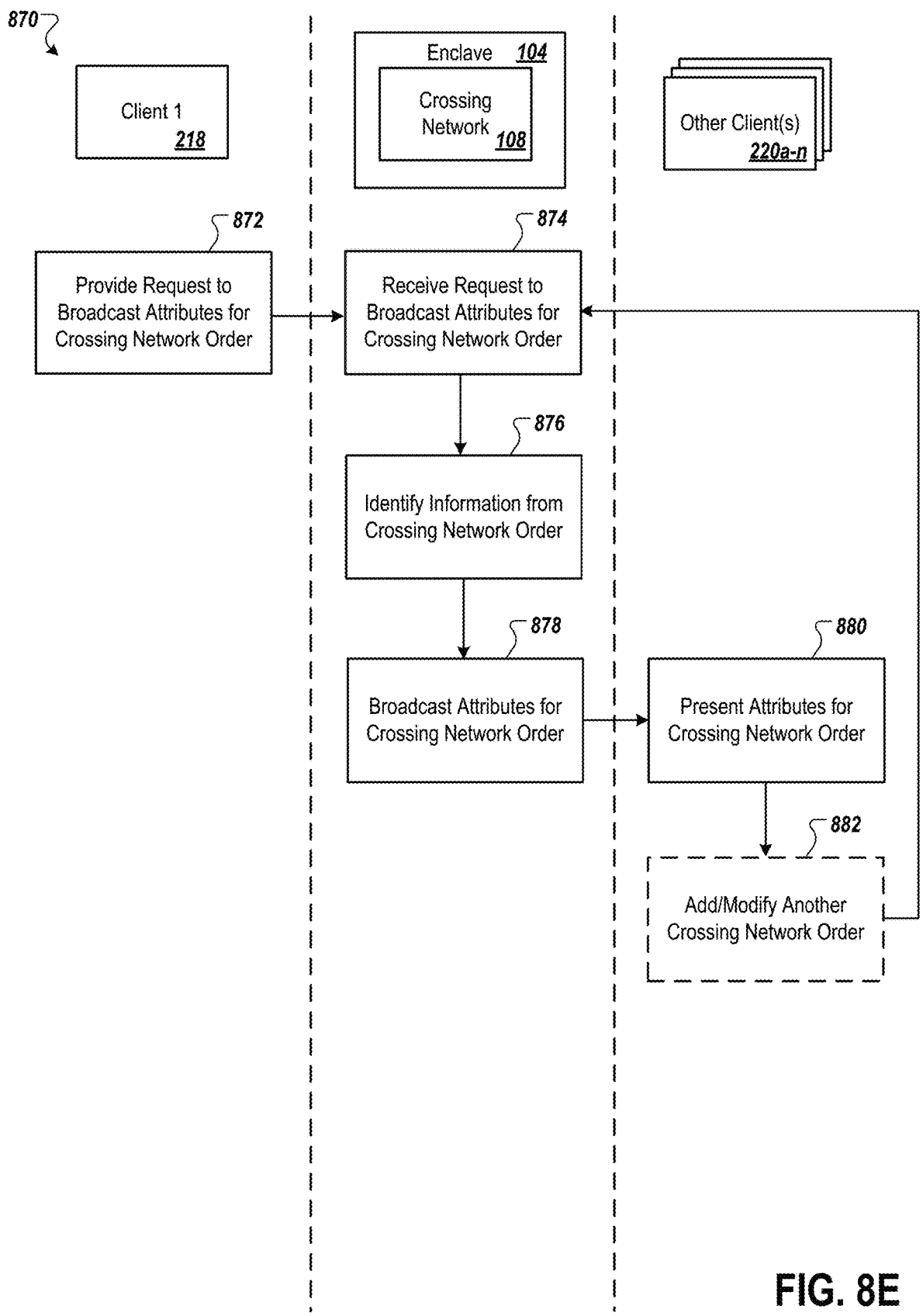

Referring to FIG. 8E, the example process 870 is shown in the context of a swimlane diagram that depicts the interactions between a client device (e.g., Client 1 218, also shown in FIG. 2), the crossing network 108, and one or more other client devices (e.g., Client 2 220, also shown in FIG. 2). In particular, the example process 870 depicts example substeps related to potentially broadcasting attributes received with a crossing network order (804, described above). A client that submits a crossing network order, for example, may choose to share all, some, or none of the order information that pertains to the order (e.g., the order conditions), with other clients that participate in the market. For example, the client may submit a crossing network order to purchase 100 BTC (in exchange for ETH), which is to expire in one week's time. In the present example, the client can choose to share information that indicates that the crossing network order is for purchasing at least 10 BTC (a portion of the actual amount of the order), and that the order will be available for at least two days (a portion of the actual time-to-live for the order). As another example, the client can simply choose to indicate that an order has been provided for purchasing BTC, without additional information. By sharing at least some of the information that pertains to the order, for example, the client that submits the order can signal an indication of interest in the market, without disclosing full details for the submitted order.

The Client 1 218 can provide a request to broadcast attributes for a crossing network order (872). For example, the client can provide the request to broadcast specified attributes along with a crossing network order. As another example, the client can update an existing crossing network order to begin broadcasting specified attributes. For example, a crossing network order may have previously been added to the order book but has remained unmatched. By updating the order to broadcast specified attributes, for example, other clients can be informed of the order, which may potentially lead to quicker matching of the order. The specified attributes, for example, can include one or more of a presence of the order, a partial amount of the order, a full amount of the order, a partial time-to-live for the order, a full time-to-live for the order, and/or other order attributes.

In some implementations, a request to broadcast attributes for a crossing network order can include a specification of which other clients are to receive the broadcast information. For example, a first client can specify that all other clients that have access to the order book are to be provided with the broadcast information. As another example, the first client can specify that only other clients that currently have one or more crossing network orders in the order book are to be provided with the broadcast information. As another example, the first client can specify that only other clients that currently have one or more crossing network orders on the other side of the order book are to be provided with the broadcast information. As another example, the first client can specify that only other clients that currently have a crossing network order of a specified amount (e.g., a range of amounts) are to be provided with the broadcast information.

The crossing network 108 can receive the request to broadcast attributes for the crossing network order (874) from the Client 1 218, and in response can identify information from the crossing network order (876). For example, the crossing network 108 can retrieve information from the crossing network order that corresponds to the attributes specified by the Client 1 218, and can broadcast the attribute information (878) to one or more other clients 220*a-n*. Broadcasting the attribute information, for example, can include pushing the information to the clients (e.g., through a message, an alert, or another mechanism). As another example, broadcasting the attribute information can include presenting the information with other order book related information, in response to a request for information from any of the client devices that have been designated as being permitted to receive the information (e.g., according to a specification by the first client).

One or more of the other clients 220*a-n* can present attributes for the crossing network order 880. For example, the client 220 can provide an interface that presents information for the order book and other related information (e.g., attribute information for crossing network orders included in the order book). Optionally, one or more of the clients 220*a-n* can add/modify another crossing network order, based on the broadcasted attribute information. For example, in response to a notification of the existence of an order to buy BTC in the crossing network 108, the client 220 can place a crossing network order to sell BTC. As another example, in response to a notification of the existence of an order to buy a particular amount of BTC in the crossing network 108, the client can place a crossing network order to sell a corresponding amount of BTC.

Figure 9:
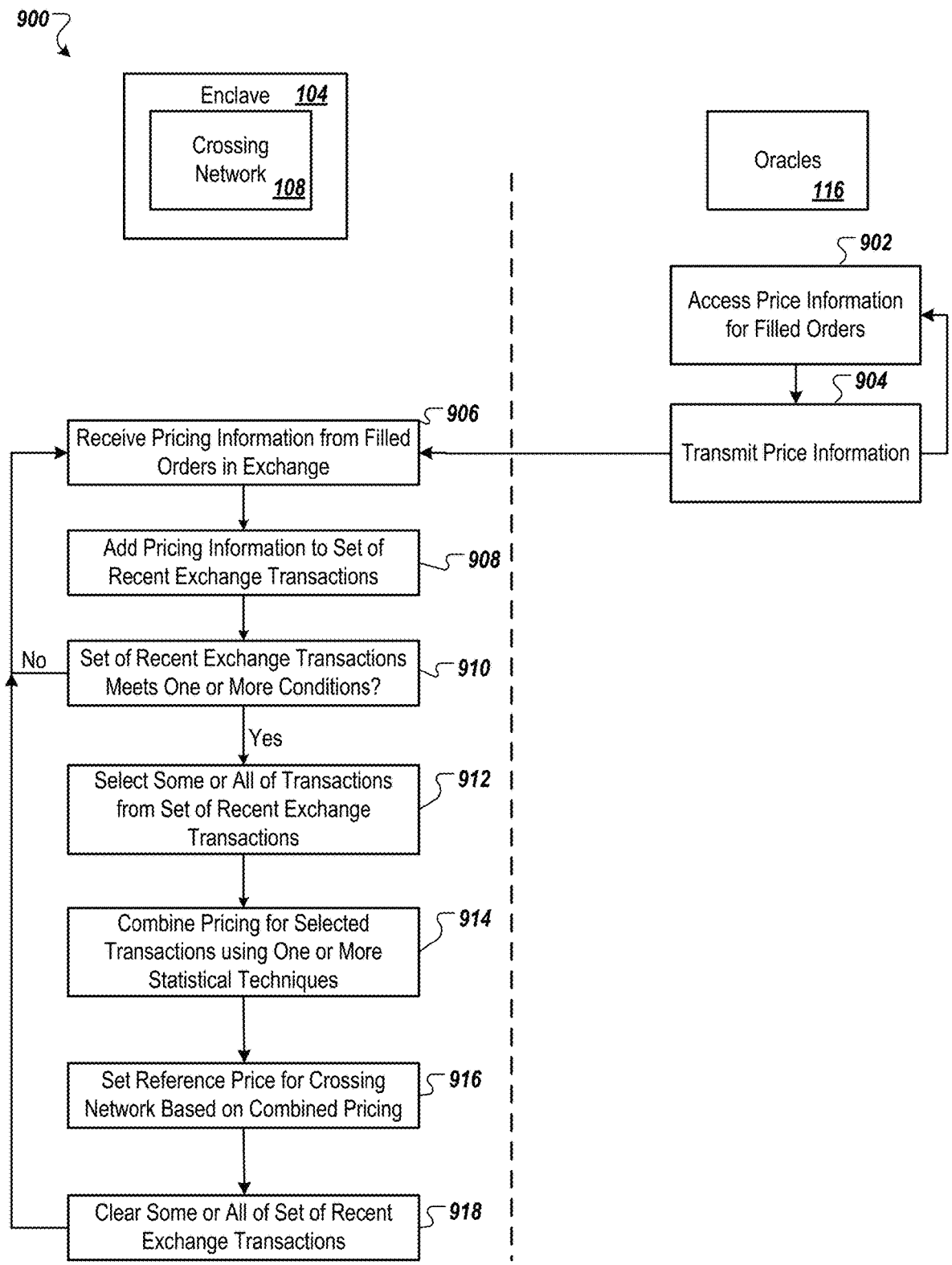
FIG. 9 is a swimlane diagram of an example process for determining reference pricing to use within the crossing network base on pricing information for transactions within an exchange.

FIG. 9 is a swimlane diagram of an example process 900 for determining reference pricing to use within the crossing network based on pricing information for transactions within an exchange. The example process 900 can be performed by any of a variety of appropriate crossing networks and enclave computing environments, such as the crossing networks and enclaves described above with regard to FIGS. 1, 2, and/or 3. The components from the system 100 are depicted as performing the process 900, but other computing environments and components are also possible.

As part of the process 900, the oracles 116 an access the pricing information for filled orders (902) and transmit the pricing information to the crossing network 108 (904). The crossing network 108 can receive the pricing information (906) and add the pricing information to a set of recent pricing exchange transactions (908). The set of recent pricing exchange transactions can be evaluated to determine whether it meets one or more conditions to update the reference price (910). Any of a variety of conditions can be examined, such as whether there was a sufficient number of transactions included in the pricing information, whether there was a sufficient volume of asset-pairs exchanged as part of the transactions included in the pricing information, whether a sufficient amount of time has elapsed since a previous reference price was determined, and/or other conditions. If a determination is made that the one or more conditions have not been met, the process can repeat steps 906-910 until sufficient pricing information has been received to update the reference price.

In the event the one or more conditions have been met at step 910, then some or all of the transactions in the set of recent exchange transactions can be selected (912). For example, in some instances transaction prices that are outliers with regard to the set of transactions (e.g., outlier with regard to mean price for set of transactions, outlier with regard to median price for set of transactions, outliers with regard to standard deviation for the set of transactions) can be removed from the set (not selected in step 912). In another example, transactions may need to satisfy one or more criteria in order to be selected, such as a minimum quantity of assets traded as part of the transaction and/or other conditions. The selected transactions can be combined using one or more statistical techniques (914), such as determining a median of the selected transactions, a mean of the selected transactions, a weighted mean of the selected transactions (e.g., weighting price based on quantity of assets traded in transaction), and/or other statistical combinations. The reference price can be set based on the combined pricing (916). For example, the reference price can be set as at the combined pricing level, and/or the reference price may be blended or otherwise combined with reference prices for adjacent time periods (e.g., averaged with the previous reference price, weighted average with the previous reference price where current combined pricing level is weighted more greatly than previous reference price). Some or all of the set of recent exchange transactions may be cleared (918), and the steps 906-918 can be repeated. For example, reference pricing for adjacent time periods may use separated or overlapping pricing information from the exchange, which may result in some or all of the recent pricing information being cleared before new pricing information is added to the set.

Figure 10:
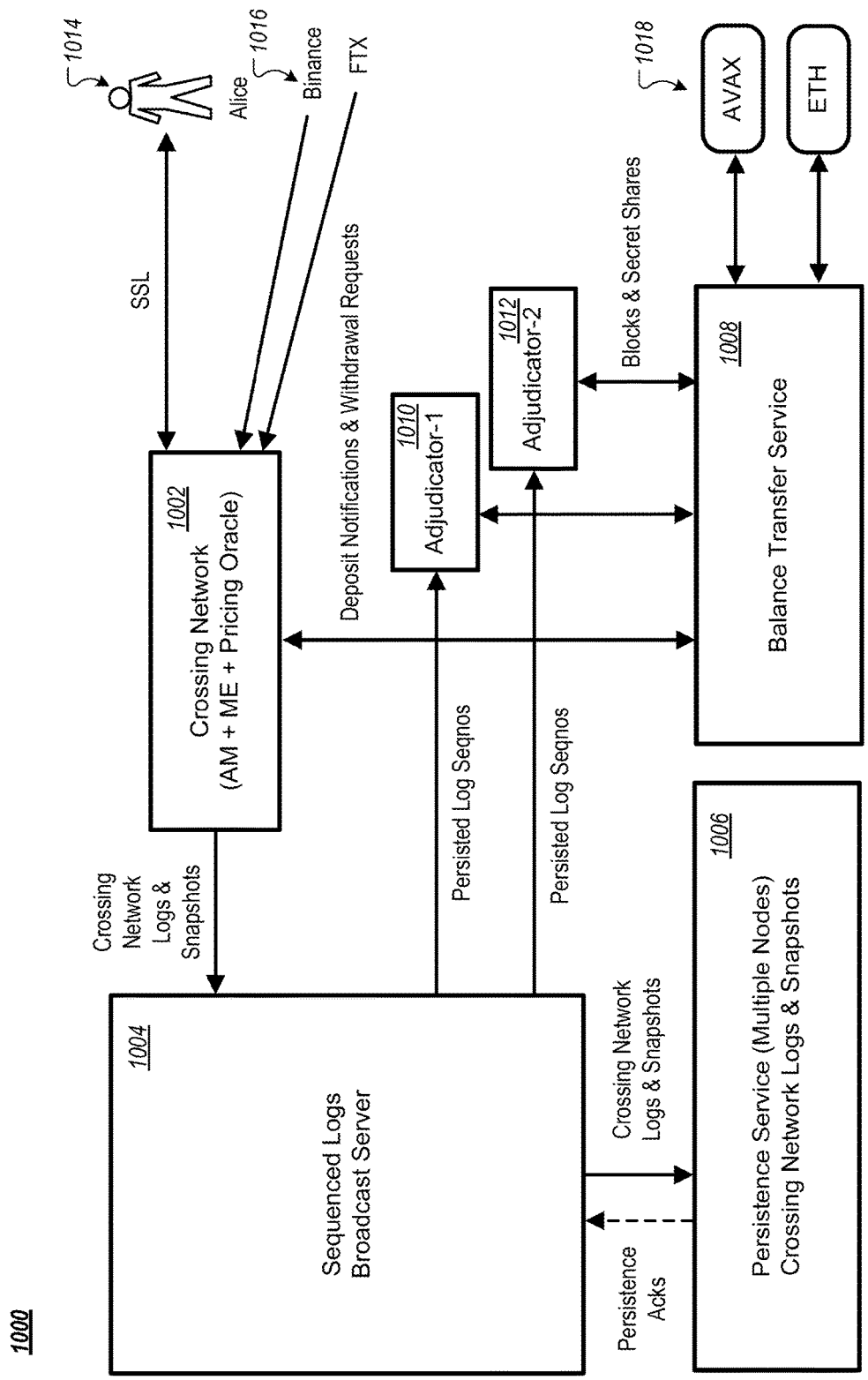
FIG. 10 is an example system for providing a crossing network running in a secure enclave as described throughout this document.

FIG. 10 is an example system 1000 for providing a crossing network 1002 running in a secure enclave as described throughout this document. The example system 1000 and crossing network 1002 (and other features) can be similar to the other systems and crossing network described throughout this document, and can include other features and implement processes described throughout this document. Additionally, the features of the example system 1000 can be incorporated into and used as part of the other systems, components, and processes described.

The example system 1000 includes a crossing network 1002, which can be implemented in a secure enclave. The crossing network 1002 can include an account manager ("AM"), a matching engine ("ME"), and a pricing oracle. The account manager can process and manage client accounts within the crossing network 1002, such as managing account creation, account balances, a transaction ledger, and transaction settlement across accounts. The matching engine can match orders that are contained in the crossing network order book. The pricing oracle, which in this example is depicted as being part of the crossing network 1002 (it can alternatively be separate from the crossing network), can obtain and provide pricing information from public exchanges 1016. The crossing network 1002 can communicate with client computing devices 1014, such as to receive crossing network orders.

The crossing network 1002 can interface, either directly or indirectly, with a sequence logs broadcast server 1004, a log persistence service 1006, a balance transfer service 1008, and adjudicators 1010-1012. Some or all of these components 1004-1012 may be separately executed within a secure enclave, like the crossing network 1002, which can provide for security and ensure that operations performed by the components 1004-1012 are not being impacted or manipulated by malicious actors. The crossing network 1002 and the components 1004-1012 can exchange information, such as transaction logs, which are used for state persistence across the system 1000 and to prevent duplicative or missed operations in the event any of the components 1002-1012 reboot, go offline, or are otherwise out of sync with the other components. Duplicative or rollback operations can include the same operation being performed multiple times, would could involve, for example, withdrawn funds being transferred multiple times (instead of once) to a client. Missed operations can include operations that are intended to be performed simply not occurring, such as a withdrawal being registered within the crossing network account but not actually occurring on-chain. The system 1000 and its components, which are described in greater detail with regard to FIGS. 11-14, are configured to maintain state persistence across the components 1002-1012 even in the event of reboots, connectivity issues, or other occurrences that may affect successful operation of the system (e.g., attacks on one or more components by a malicious actor).

The crossing network 1002 can provide crossing network logs and snapshots to the sequenced log broadcast server 1004, which can include a log of each action performed by the crossing network 1002, such as deposit information, order information, order match and fill information, order settlement information, withdrawal information, and/or others. Each action included in the crossing network logs can be stamped with a sequence number that progresses along one or more patterns (e.g., incremented value, decremented value), which the crossing network 1002 can use to determine the sequence of actions performed (and to identify a most recent action). The actions and sequence numbers included in the logs can be signed by the crossing network 1002 using a key that persists within the crossing network 1002, and which the crossing network 1002 can use to ensure that the actions and sequence numbers have not been altered by a malicious actor.

The broadcast server 1004 can broadcast the crossing network logs and snapshots to a persistence service 1006, which can use multiple redundant nodes to store crossing network logs so that they can be recalled, as needed, in order to fill-in gaps and other discrepancies in the event that the crossing network 1002 or other components go down. The broadcast server 1004 can ensure that logs have been acknowledged as being stored in at least a threshold number of the multiple nodes of the persistence service 1006 before considering the logs to be persisted logs, at which point then can then be transmitted to multiple redundant adjudicators 1010-1012 (only two are depicted, but any number of adjudicators can be used).

The adjudicators 1010-1012 can perform a variety of functions, including acting as adjudicators (as described above) to perform remote attestation on the crossing network 1002, storing state information for the crossing network 1002, storing partial key information for the crossing network 1002, interfacing with the balance transfer service 1008, and/or other operations. The adjudicators 1010-1012 can store a most recent log sequence number that it has received (discarding earlier received log sequence numbers) from the broadcast server 1004, which it can use to provide state information to the crossing network 1002 in the event that it restarts. If the crossing network 1002 restarts, it can request the most recent log information from the adjudicators 1010-1012, and then select the most recent log information it receives from among the multiple adjudicators 1010-1012 to determine the most recent state of the crossing network 1002 before it went down. As part of that process, the crossing network can additionally request key shares that are distributed across the adjudicators 1010-1012, which the crossing network 1002 can use to recreate one or more of its keys used to sign and validate various data components, such as the signed crossing log sequence numbers. The adjudicators 1010-1012 can additionally authenticate and validate the crossing network 1002 through remote attestation, such as when the crossing network 1002 restarts and/or at various points in time while the crossing network 1002 is running. The adjudicators 1010-1012 can additional maintain state information and/or key information that can be provide to the balance transfer service 1008, which may additionally use the information to ward against the balance transfer service 1008 going down and restarting.

The balance transfer service 1008 can obtain block information from various blockchains 1018 to identify deposits into the crossing network from the blockchains 1018, as described in greater detail below with regard to FIG. 13. For example, the balance transfer service 1008 can maintain and assign a unique address for each account on the crossing network 1002, which can be maintained as a secret by the balance transfer service 1008 (providing anonymity and obfuscation of which assets are being deposited into the crossing network) and which can be used to detect crossing network deposits. The balance transfer service 1008 can transmit deposit information to the crossing network 1002, which the crossing network can validate and authenticate, and then use to update accounts and corresponding asset balances within the crossing network 1002 that clients 1014 can trade. The balance transfer service 1008 can additionally process withdrawal requests, which can result in assets maintained in the private addresses on the blockchains 1018 to be transferred to client wallets. Through the crossing network logs, the crossing network 1002 and the balance transfer service 1008 can ensure that state information related to deposits and withdrawals are maintained so that duplicate operations are not performed, and also so that operations are not missed or otherwise skipped.

Figure 11:
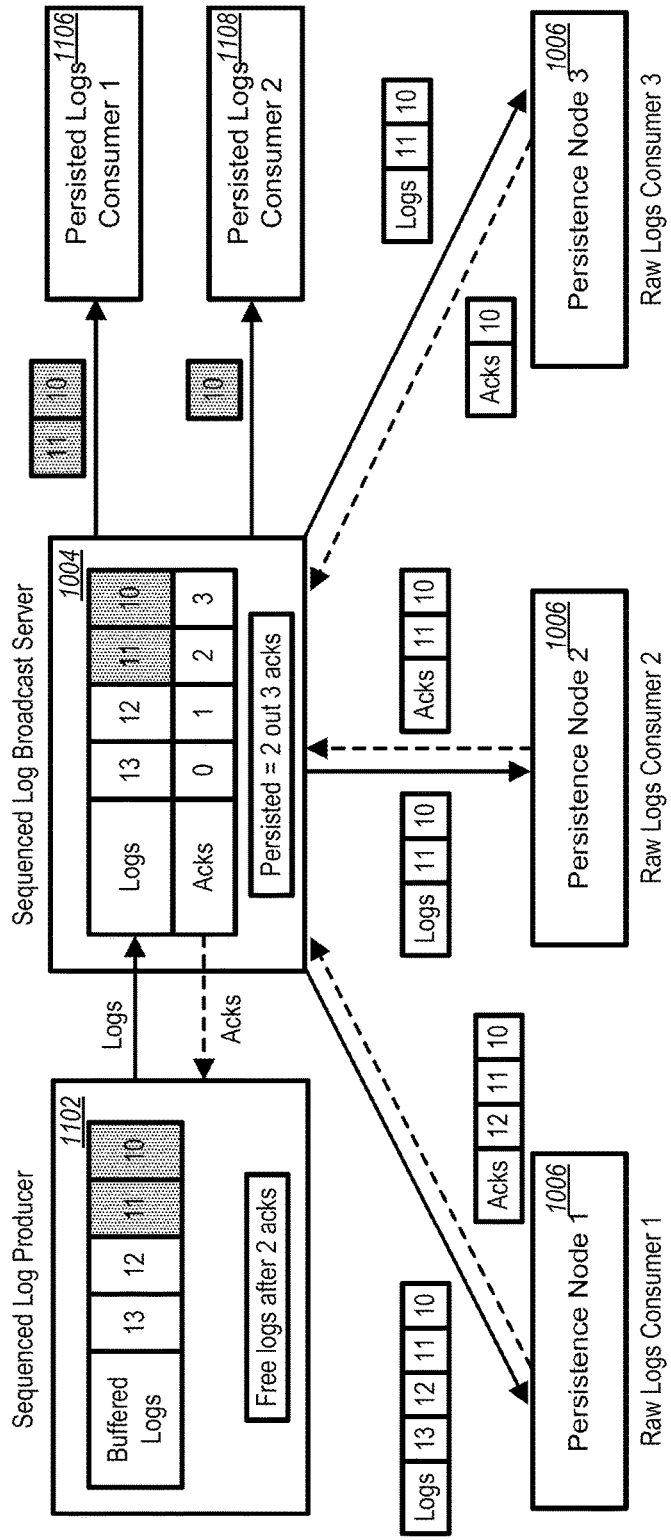
FIG. 11 is an example system and process for a sequenced log broadcast service that is being used with a crossing network running in a secure enclave.

FIG. 11 is an example system and process 1100 for a sequenced log broadcast service that is being used with a crossing network running in a secure enclave. The example system and process 1100 can be similar to the other systems and processes described throughout this document, and can incorporate other features and processes described throughout this document. Additionally, the features of the example system and process 1100 can be incorporated into and used as part of the other systems, components, and processes described.

The example system and process 1100 is generally directed to the process by which the sequenced broadcast server receive logs from a sequenced log producer 1102 that is part of the crossing network 1002, adds them to nodes of a persistence service 1006, and then distributes persisted logs to various clients 1106-1108, such as the adjudicators 1010-1012. In particular, the sequenced log producer 1102 generate a stream of logs that are maintained in a buffer of logs. These logs, represented as numbered squares in the diagram, are each numbered sequences that can be signed by the crossing network 1002. The sequenced log broadcast server 1004 receives the logs and retransmits them to each of the persistence nodes 1006, while maintaining each log in a buffer while awaiting acknowledgements of receipt and persistent storage by the nodes 1006. In the depicted example, once the server 1004 has received acknowledgement from a consensus/plurality/threshold number of nodes for each log, it can consider the log to be a "persisted log"—meaning that its state has been sufficiently and redundantly stored across the persistence nodes 1006 and that it can be retransmitted to the persisted log consumers 1106 and removed from the buffers for both the server 1004 and the sequenced log producer 1102. In the depicted example, the shaded logs "10" and "11" have been persisted after acknowledgement from multiple persistence nodes 1006, permitting those logs to be transmitted to the consumers 1106-1108, for acknowledgement to be transmitted back to the prouder 1102, which then will subsequently remove those logs from its buffer.

Figure 12:
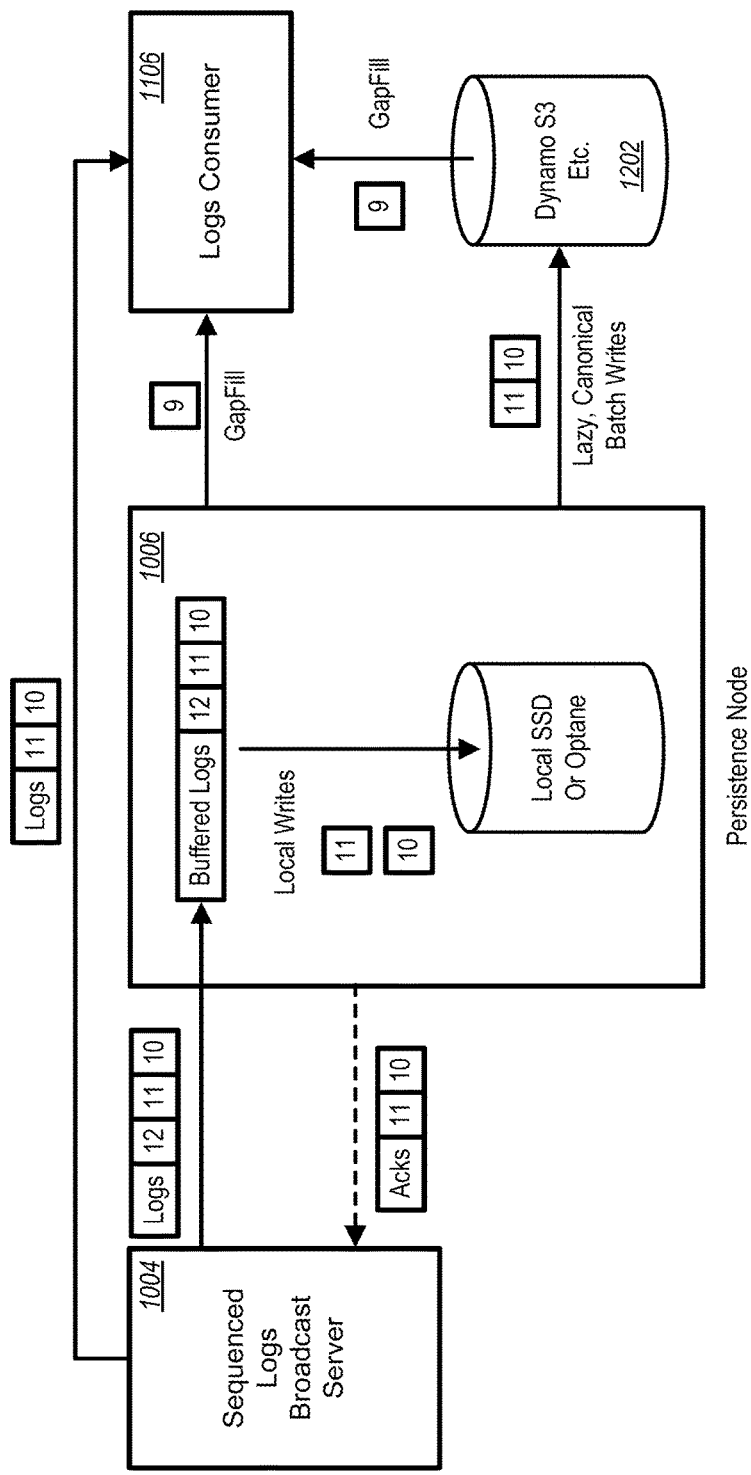
FIG. 12 is an example system and process for a persistence service node that is being used with a crossing network running in a secure enclave.

FIG. 12 is an example system and process 1200 for a persistence service node that is being used with a crossing network running in a secure enclave. The example system and process 1200 can be similar to the other systems and processes described throughout this document, and can incorporate other features and processes described throughout this document. Additionally, the features of the example system and process 1200 can be incorporated into and used as part of the other systems, components, and processes described.

The system and process 1200 depicts interactions between broadcast server 1004, the persistence service 1006, and log consumers 1106 to provide persisted nodes to the log consumer, and to provide gap filling from the persisted nodes 1006. In the depicted example, the log consumer 1106 determines that a gap in the log sequence is missing with regard to log "9" after having received logs "10" and "11" from the broadcast server 1104. The log consumer 1106 can then request that gap to be filled from one or more of the persisted nodes 1006, which can include its own local storage system, or from a remote storage system 1202 that can provide additional, long-term storage.

Figure 13:
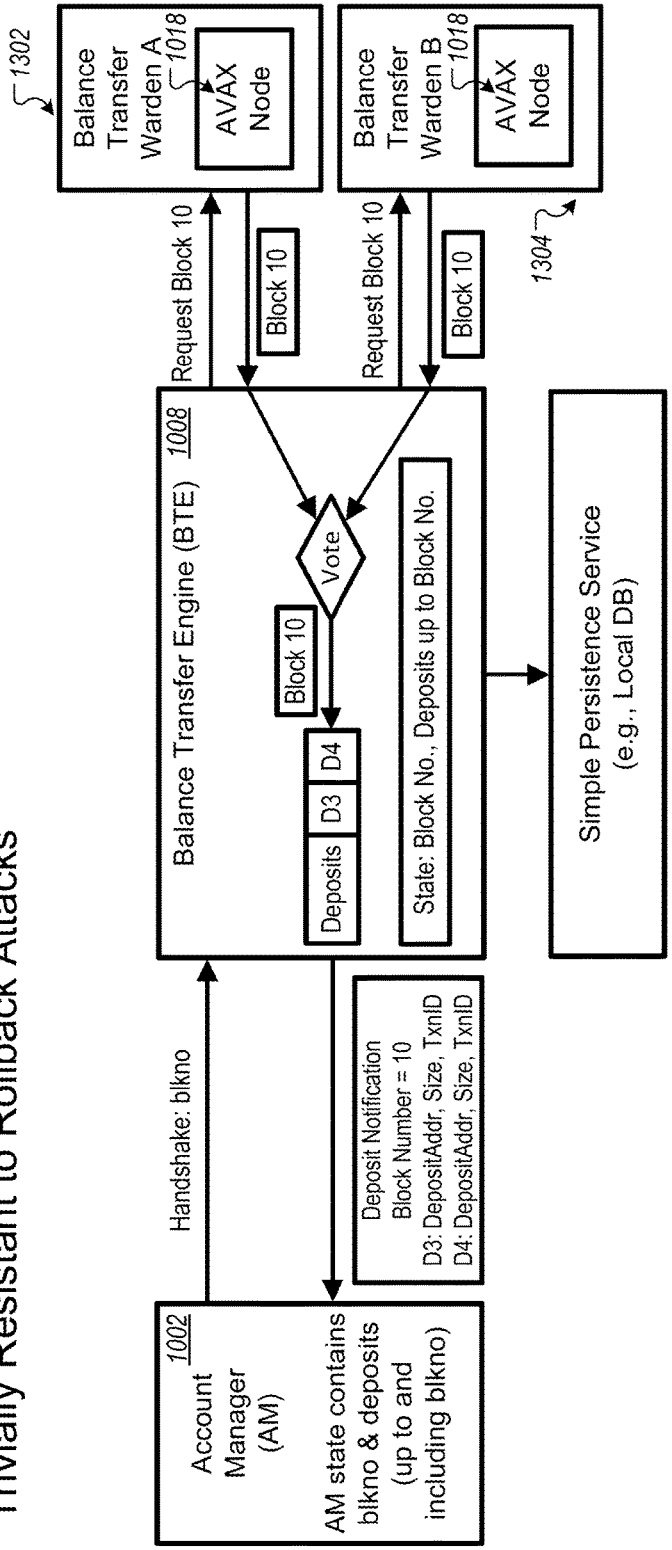
FIG. 13 is an example system and deposit process for a balance transfer service that is being used to deposit assets in a crossing network running in a secure enclave.

FIG. 13 is an example system and deposit process 1300 for a balance transfer service that is being used to deposit assets in a crossing network running in a secure enclave. The example system and process 1300 can be similar to the other systems and processes described throughout this document, and can incorporate other features and processes described throughout this document. Additionally, the features of the example system and process 1300 can be incorporated into and used as part of the other systems, components, and processes described.

The example system and process 1300 can use balance transfer adjudicators 1302-1304 that pull the most recent blocks from blockchains 1018 that can be used to deposit assets into the crossing network 1002. The adjudicators 1302-1304 can provide block information, which the balance transfer engine 1008 can parse and evaluate to determine whether the block pertains to a deposit into the crossing network. As mentioned above, the crossing network can maintain a collection of addresses on the blockchain 1018, which clients can used to deposit funds into the crossing network by transferring assets to the addresses. The balance transfer engine 1008 can compare the address for the block and, if it is not one of the collection of addresses, the block can be discarded. If the block is part of the collection of addresses for the crossing network, details from the block can be extracted, including the deposit address, which can be used to identify the account into which the deposit is being made (based on each account having one or more dedicated addresses for deposits), the size of the deposit, and transaction identifier that can be assigned to each deposit. The balance transfer engine 1008 can transfer the deposit information along with state information for the balance transfer engine 1008 (i.e., block number and deposits up to block number) to the crossing network 1002 and its account manager, which can provide acknowledgement.

The balance transfer engine 1008 can maintain persistence information in local database, as well, which can include the most recent block number received/evaluated from the adjudicators 1302 and the block number up to which the deposits have been transmitted to the crossing network 1002. The crossing network 1002 and the balance transfer engine 1008 can perform a handshake using the block number state information to ensure that they are remaining in sync as deposits are received.

Figure 14:
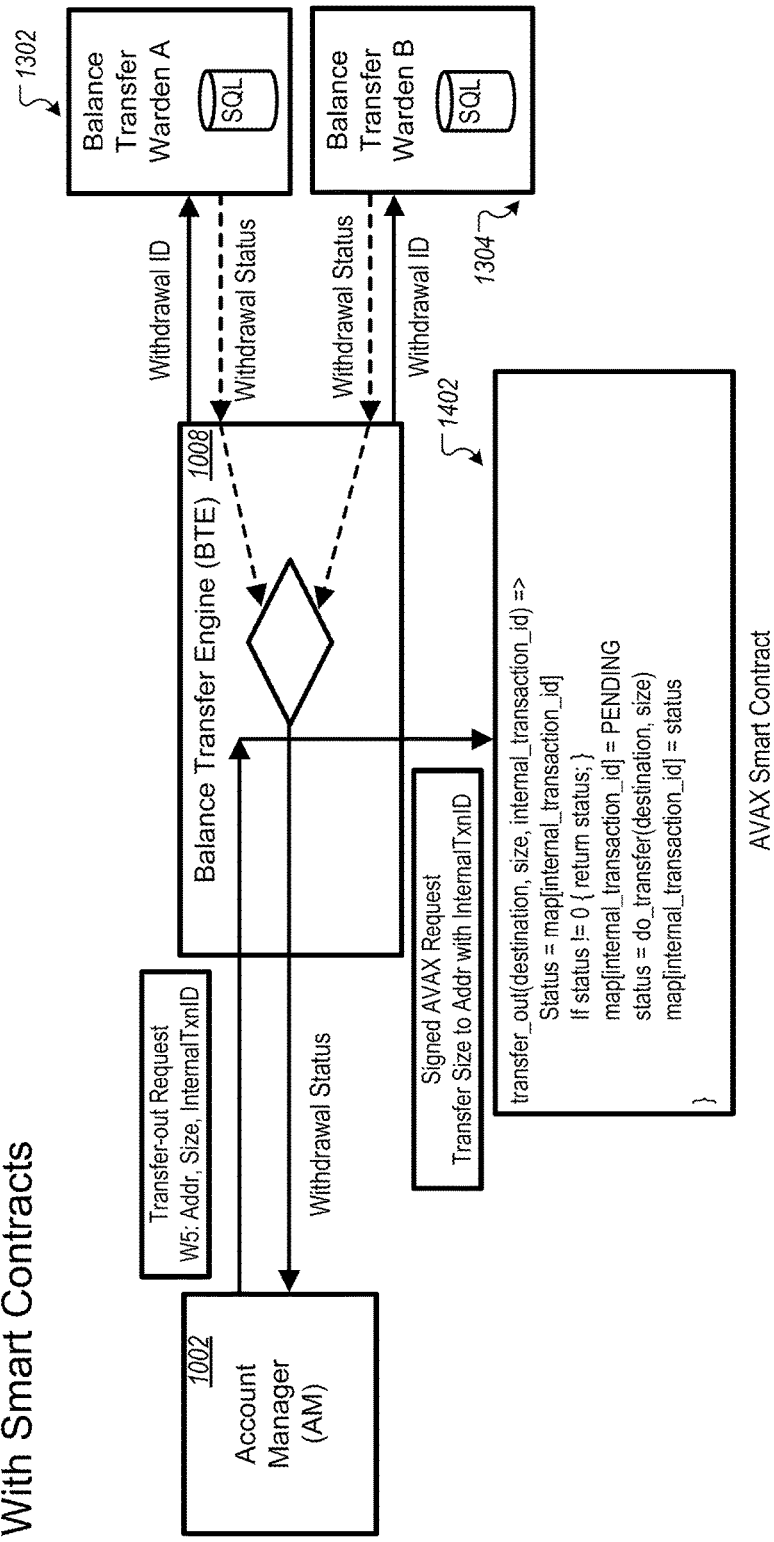
FIG. 14 is an example system and withdrawal process for a balance transfer service that is being used to withdraw assets from a crossing network running in a secure enclave.

FIG. 14 is an example system and withdrawal process 1400 for a balance transfer service that is being used to withdraw assets from a crossing network running in a secure enclave. The example system and process 1400 can be similar to the other systems and processes described throughout this document, and can incorporate other features and processes described throughout this document. Additionally, the features of the example system and process 1400 can be incorporated into and used as part of the other systems, components, and processes described.

The example system and process 1400 walk through the withdrawal process for withdrawing assets from an account within the crossing network 1002 for transfer into a client address on a blockchain. The crossing network 1002 can transmit a withdrawal/transfer-out request, which can include the client address to which the deposit will be made, the size of the withdrawal, and the internal transaction identifier. The balance transfer engine 1008 can receive the request and can generate a signed request 1402 to process the transaction on-chain. The request 1402 can take the form of a smart contract, which can incorporate the transaction identifier in association with the transfer and status information, which the adjudicators 1302-1304 can monitor for based on withdrawal identifier information from the balance transfer engine 1008. Once acknowledgement of the transfer being completed is received from the adjudicators 1302-1304, it can be provided relayed to the crossing network 1002.

Although FIGS. 1-14 depict varying embodiments, some of which may include features that are not present in other embodiments, the features from each of the embodiments depicted in and described with regard to FIGS. 1-14 can be combined with every other embodiment described in this document.

Figure 15:
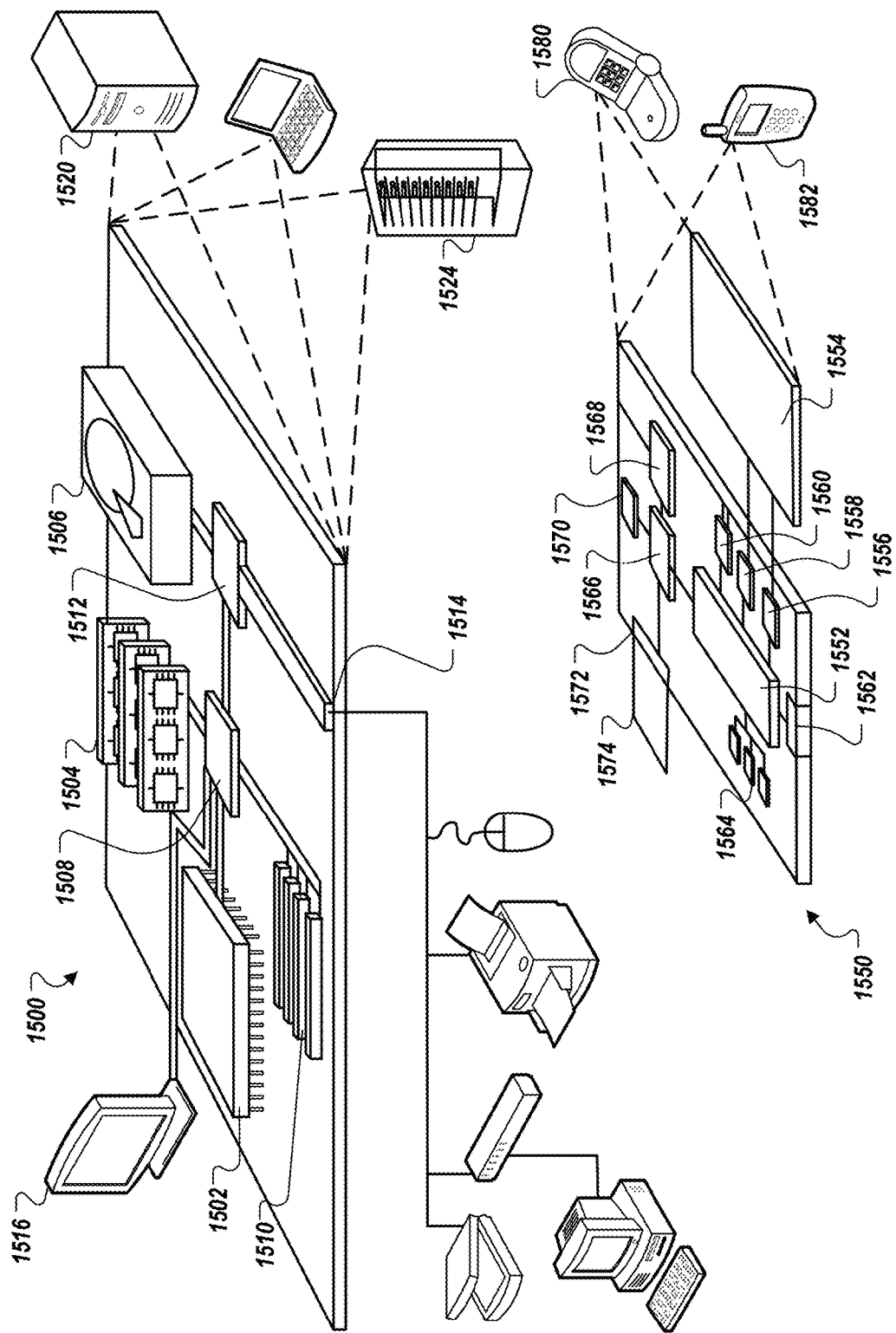
FIG. 15 is a schematic diagram that shows an example of a computing device and a mobile computing device.

FIG. 15 shows an example of a computing device 1500 and an example of a mobile computing device that can be used to implement the techniques described here. The computing device 1500 is intended to represent various forms of digital computers, such as laptops, desktops, workstations, personal digital assistants, servers, blade servers, mainframes, and other appropriate computers. The mobile computing device is intended to represent various forms of mobile devices, such as personal digital assistants, cellular telephones, smart-phones, and other similar computing devices. The components shown here, their connections and relationships, and their functions, are meant to be exemplary only, and are not meant to limit implementations of the inventions described and/or claimed in this document.

The computing device 1500 includes a processor 1502, a memory 1504, a storage device 1506, a high-speed interface 1508 connecting to the memory 1504 and multiple high-speed expansion ports 1510, and a low-speed interface 1512 connecting to a low-speed expansion port 1514 and the storage device 1506. Each of the processor 1502, the memory 1504, the storage device 1506, the high-speed interface 1508, the high-speed expansion ports 1510, and the low-speed interface 1512, are interconnected using various busses, and can be mounted on a common motherboard or in other manners as appropriate. The processor 1502 can process instructions for execution within the computing device 1500, including instructions stored in the memory 1504 or on the storage device 1506 to display graphical information for a GUI on an external input/output device, such as a display 1516 coupled to the high-speed interface 1508. In other implementations, multiple processors and/or multiple buses can be used, as appropriate, along with multiple memories and types of memory. Also, multiple computing devices can be connected, with each device providing portions of the necessary operations (e.g., as a server bank, a group of blade servers, or a multi-processor system).

The memory 1504 stores information within the computing device 1500. In some implementations, the memory 1504 is a volatile memory unit or units. In some implementations, the memory 1504 is a non-volatile memory unit or units. The memory 1504 can also be another form of computer-readable medium, such as a magnetic or optical disk.

The storage device 1506 is capable of providing mass storage for the computing device 1500. In some implementations, the storage device 1506 can be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product can also contain instructions that, when executed, perform one or more methods, such as those described above. The computer program product can also be tangibly embodied in a computer- or machine-readable medium, such as the memory 1504, the storage device 1506, or memory on the processor 1502.

The high-speed interface 1508 manages bandwidth-intensive operations for the computing device 1500, while the low-speed interface 1512 manages lower bandwidth-intensive operations. Such allocation of functions is exemplary only. In some implementations, the high-speed interface 1508 is coupled to the memory 1504, the display 1516 (e.g., through a graphics processor or accelerator), and to the high-speed expansion ports 1510, which can accept various expansion cards (not shown). In the implementation, the low-speed interface 1512 is coupled to the storage device 1506 and the low-speed expansion port 1514. The low-speed expansion port 1514, which can include various communication ports (e.g., USB, Bluetooth, Ethernet, wireless Ethernet) can be coupled to one or more input/output devices, such as a keyboard, a pointing device, a scanner, or a networking device such as a switch or router, e.g., through a network adapter.

The computing device 1500 can be implemented in a number of different forms, as shown in the figure. For example, it can be implemented as a standard server 1520, or multiple times in a group of such servers. In addition, it can be implemented in a personal computer such as a laptop computer 1522. It can also be implemented as part of a rack server system 1524. Alternatively, components from the computing device 1500 can be combined with other components in a mobile device (not shown), such as a mobile computing device 1550. Each of such devices can contain one or more of the computing device 1500 and the mobile computing device 1550, and an entire system can be made up of multiple computing devices communicating with each other.

The mobile computing device 1550 includes a processor 1552, a memory 1564, an input/output device such as a display 1554, a communication interface 1566, and a transceiver 1568, among other components. The mobile computing device 1550 can also be provided with a storage device, such as a micro-drive or other device, to provide additional storage. Each of the processor 1552, the memory 1564, the display 1554, the communication interface 1566, and the transceiver 1568, are interconnected using various buses, and several of the components can be mounted on a common motherboard or in other manners as appropriate.

The processor 1552 can execute instructions within the mobile computing device 1550, including instructions stored in the memory 1564. The processor 1552 can be implemented as a chipset of chips that include separate and multiple analog and digital processors. The processor 1552 can provide, for example, for coordination of the other components of the mobile computing device 1550, such as control of user interfaces, applications run by the mobile computing device 1550, and wireless communication by the mobile computing device 1550.

The processor 1552 can communicate with a user through a control interface 1558 and a display interface 1556 coupled to the display 1554. The display 1554 can be, for example, a TFT (Thin-Film-Transistor Liquid Crystal Display) display or an OLED (Organic Light Emitting Diode) display, or other appropriate display technology. The display interface 1556 can comprise appropriate circuitry for driving the display 1554 to present graphical and other information to a user. The control interface 1558 can receive commands from a user and convert them for submission to the processor 1552. In addition, an external interface 1562 can provide communication with the processor 1552, so as to enable near area communication of the mobile computing device 1550 with other devices. The external interface 1562 can provide, for example, for wired communication in some implementations, or for wireless communication in other implementations, and multiple interfaces can also be used.

The memory 1564 stores information within the mobile computing device 1550. The memory 1564 can be implemented as one or more of a computer-readable medium or media, a volatile memory unit or units, or a non-volatile memory unit or units. An expansion memory 1574 can also be provided and connected to the mobile computing device 1550 through an expansion interface 1572, which can include, for example, a SIMM (Single In Line Memory Module) card interface. The expansion memory 1574 can provide extra storage space for the mobile computing device 1550, or can also store applications or other information for the mobile computing device 1550. Specifically, the expansion memory 1574 can include instructions to carry out or supplement the processes described above, and can include secure information also. Thus, for example, the expansion memory 1574 can be provided as a security module for the mobile computing device 1550, and can be programmed with instructions that permit secure use of the mobile computing device 1550. In addition, secure applications can be provided via the SIMM cards, along with additional information, such as placing identifying information on the SIMM card in a non-hackable manner.

The memory can include, for example, flash memory and/or NVRAM memory (non-volatile random access memory), as discussed below. In some implementations, a computer program product is tangibly embodied in an information carrier. The computer program product contains instructions that, when executed, perform one or more methods, such as those described above. The computer program product can be a computer- or machine-readable medium, such as the memory 1564, the expansion memory 1574, or memory on the processor 1552. In some implementations, the computer program product can be received in a propagated signal, for example, over the transceiver 1568 or the external interface 1562.

The mobile computing device 1550 can communicate wirelessly through the communication interface 1566, which can include digital signal processing circuitry where necessary. The communication interface 1566 can provide for communications under various modes or protocols, such as GSM voice calls (Global System for Mobile communications), SMS (Short Message Service), EMS (Enhanced Messaging Service), or MMS messaging (Multimedia Messaging Service), CDMA (code division multiple access), TDMA (time division multiple access), PDC (Personal Digital Cellular), WCDMA (Wideband Code Division Multiple Access), CDMA2000, or GPRS (General Packet Radio Service), among others. Such communication can occur, for example, through the transceiver 1568 using a radio-frequency. In addition, short-range communication can occur, such as using a Bluetooth, WiFi, or other such transceiver (not shown). In addition, a GPS (Global Positioning System) receiver module 1570 can provide additional navigation- and location-related wireless data to the mobile computing device 1550, which can be used as appropriate by applications running on the mobile computing device 1550.

The mobile computing device 1550 can also communicate audibly using an audio codec 1560, which can receive spoken information from a user and convert it to usable digital information. The audio codec 1560 can likewise generate audible sound for a user, such as through a speaker, e.g., in a handset of the mobile computing device 1550. Such sound can include sound from voice telephone calls, can include recorded sound (e.g., voice messages, music files, etc.) and can also include sound generated by applications operating on the mobile computing device 1550.

The mobile computing device 1550 can be implemented in a number of different forms, as shown in the figure. For example, it can be implemented as a cellular telephone 1580. It can also be implemented as part of a smart-phone 1582, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms machine-readable medium and computer-readable medium refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term machine-readable signal refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network (LAN), a wide area network (WAN), and the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of the disclosed technology or of what may be claimed, but rather as descriptions of features that may be specific to particular embodiments of particular disclosed technologies. Certain features that are described in this specification in the context of separate embodiments can also be implemented in combination in a single embodiment in part or in whole. Conversely, various features that are described in the context of a single embodiment can also be implemented in multiple embodiments separately or in any suitable subcombination. Moreover, although features may be described herein as acting in certain combinations and/or initially claimed as such, one or more features from a claimed combination can in some cases be excised from the combination, and the claimed combination may be directed to a subcombination or variation of a subcombination. Similarly, while operations may be described in a particular order, this should not be understood as requiring that such operations be performed in the particular order or in sequential order, or that all operations be performed, to achieve desirable results. Particular embodiments of the subject matter have been described. Other embodiments are within the scope of the following claims.

Implementations of the aspects described in this document include methods, corresponding apparatus and computer programs recorded on one or more computer storage devices, and corresponding systems, each configured to perform the actions of the methods.

Example Embodiments Include

1. A system to provide a secure crossing network for trading digital blockchain assets outside of a blockchain exchange, the system comprising:
    a crossing network program that is configured to provide a crossing network for the digital blockchain assets;
    a computer system with a secure enclave that is configured to provide the trusted execution environment within which processing of programs is secure from observation and manipulation by other operations outside of the secure enclave, wherein execution of the crossing network program in the secure enclave comprises:
    loading the crossing network program into secure memory within the secure enclave;
    generating and providing, in response to a remote attestation challenge, one or more validation values generated based on at least a portion of the crossing network program loaded into the secure memory, the one or more validation values being used by one or more other computer systems to validate the crossing network program is authentic and unmodified;
    receiving, from client devices, crossing network orders to trade assets within the crossing network;
    adding the crossing network orders to an order book maintained within the secure memory for the crossing network;
    matching at least a portion of the crossing network orders in the order book;
    obtaining, using a pricing oracle, pricing information for transactions in the blockchain exchange occurring within a time period of the order matching;

determining a reference price for the matched orders within the crossing network based on the pricing information from the blockchain exchange; and
filling the matched orders within the crossing network at the reference price.

2. The system of embodiment 1, wherein the execution of the crossing network program in the secure enclave further comprises:
receiving the remote attestation challenge from the one or more other computing systems outside the secure enclave; and
wherein one or more values are transmitted to the one or more other computing systems.

3. The system of embodiment 2, wherein the remote attestation challenge request is received from one or more adjudicator computing devices.

4. The system of any of embodiments 1-3, wherein the reference price is determined based on a median price of the transactions included in the pricing information.

5. The system of any of embodiments 1-4, wherein the reference price is determined based on a mean price of the transactions included in the pricing information.

6. The system of any of embodiments 1-5, wherein the reference price is determined based on a median of the pricing information provided by a plurality of pricing oracles.

7. The system of any of embodiments 1-6, wherein the reference price is determined based on a weighted mean of prices for the transactions included in the pricing information.

8. The system of any of embodiments 1-7, wherein the reference price is determined based on excluding one or more outlier prices from among the transactions included in the pricing information.

9. The system of any of embodiments 1-8, wherein adding a crossing network order to the order book is performed in response to determining that a transaction size of the crossing network order meets a minimum transaction size.

10. The system of any of embodiments 1-9, wherein the orders are assigned a unique transaction identifier.

11. The system of embodiment 10, further comprising:
transmitting the transaction identifier for the orders to the client devices.

12. The system of embodiment 11, further comprising:
receiving a cancellation request for a particular order identified by a particular transaction identifier; and
removing the particular order from the order book based on the cancellation request.

13. The system of any of embodiments 1-12, further comprising:
determining whether a crossing network order satisfies one or more conditions for being matched to another order in the order book;
wherein the crossing network order is matched to the another order in the order book in response to the orders satisfying the one or more conditions.

14. The system of any of embodiments 1-13, wherein the one or more conditions comprise a price band, wherein the crossing network order is matched to the another order in the order book when the reference price is within the price band.

15. The system of embodiment 13 or 14, wherein the one or more conditions comprise a corresponding account for the crossing network order having a sufficient account balance to complete the order.

16. The system of embodiment 15, wherein an account has a sufficient balance when the account has a current balance to cover a quantity of digital currency specified in the order and to cover an associated fee for the transaction within the crossing network.

17. The system of any of embodiments 1-16, further comprising:
identifying that a particular crossing network order associated with a particular account includes a prioritization request;
deducting a prioritization fee from the particular account; and
adding the particular crossing network order to a prioritized position in the order book.

18. The system of any of embodiments 1-17, further comprising:
a notification system outside of the secure enclave that is configured to transmit notifications to the client devices in response to transaction activity within the crossing network.

19. The system of any of embodiments 1-18, wherein the crossing network orders comprise market orders.

20. The system of embodiment 19, wherein the market orders include one or more conditions.

21. The system of embodiment 20, wherein the one or more conditions comprise a duration during which the market order is valid.

22. The system of embodiment 20 or 21, wherein the one or more conditions comprise a price range within which the market order is valid.

23. The system of any of embodiments 20-22, wherein the execution of the crossing network program further comprises:
receiving, from a first client device, a request to broadcast partial information related to a first crossing network order associated with the first client device;
identifying, from the order book, the partial information for the first crossing network order; and
providing information that indicates the partial information for the first crossing network order to at least a portion of the client devices, wherein the partial information identifies at least one of the one or more conditions for the first crossing network order.

24. The system of any of embodiments 1-23, wherein:
the crossing network maintains client accounts with account balances that identify digital assets tradable within the crossing network for a client accounts,
depositing the digital assets into the client accounts comprises:
transferring the digital assets into one or more accounts associated with the crossing network, the one or more accounts being external to the crossing network, and
in response to detecting and verifying the transfer of the blockchain tokens into the one or more accounts, incrementing the account balance for a corresponding client account within the crossing network.

25. The system of any of embodiments 1-24, wherein:
the digital assets comprise blockchain digital assets,
transferring the digital assets into the one or more accounts comprises transferring blockchain tokens into one or more on-chain wallets associated with the crossing network, and the incrementing the account balance is performed in response to detecting and verifying the transfer of the blockchain tokens into the one or more on-chain wallets.
26. The system of embodiment 25, wherein the incrementing the account balance is performed while maintaining the corresponding blockchain tokens within the one or more on-chain wallets.
27. The system of any of embodiments 24-26, wherein: withdrawing digital assets from the crossing network comprises:
    identifying a quantity of the digital assets to be withdrawn and a destination address corresponding to a client's on-chain wallet,
    transferring one or more tokens corresponding to the quantity of digital assets from the on-chain wallets associated with the crossing network to the client's on-chain wallet, and
    updating a corresponding account balance within the crossing network to reflect withdrawal of the digital assets.
28. The system of any of embodiments 24-27, wherein the incrementing the account balance is performed while maintaining the corresponding digital assets within the one or more accounts.
29. The system of any of embodiments 24-28, wherein: withdrawing digital assets from the crossing network comprises:
    identifying a quantity of the digital assets to be withdrawn and a destination address corresponding to a client's external account outside the crossing network,
    transferring one or more digital assets corresponding to the quantity of digital assets from the one or more accounts associated with the crossing network to the client's external account, and
    updating a corresponding account balance within the crossing network to reflect withdrawal of the digital assets.
30. The system of any of embodiments 1-29, wherein the matching operation is performed continuously in response to each of the crossing network orders being received and added to the order book.
31. The system of any of embodiments 1-29, wherein the matching operation is iteratively performed every $\tau$ period of time and independent of receiving and adding the crossing network orders to the order book.
32. The system of embodiment 31, wherein every $\tau$ period of time corresponds to a plurality of predetermined times at which the matching operation is performed.
33. The system of embodiment 31, wherein the $\tau$ period of time corresponds to a predetermined time interval.
34. The system of any of embodiments 31-33, wherein the matching operation is iteratively performed across a plurality of differing time intervals that, collectively, correspond to the $\tau$ period of time.
35. The system of embodiment 34, wherein an average of the plurality of differing time intervals corresponds to the $\tau$ period of time.
36. The system of any of embodiments 34-35, wherein after each iteration of the matching operation is performed, a next time interval of the plurality of differing time intervals is determined based on an outcome of a stochastic process.
37. The system of embodiment 36, wherein the stochastic process comprises a poisson dice roll process.
38. The system of any of embodiments 36-37, wherein the stochastic process ensures an average time interval of the plurality of differing time intervals corresponds to the $\tau$ period of time.
39. The system of any of embodiments 1-38, wherein:
    the crossing network orders include associated crossing network transaction fees,
    the orders are added to the order book with the associated crossing network transaction fees, and
    the execution of the crossing network program further comprises:
        sorting the crossing network orders within the order book based on the associated crossing network transaction fees.
40. The system of embodiment 39, wherein the matching is performed by sequentially evaluating each of the crossing network orders in the order book for matches according to a sequence provided by the sorted order book.
41. The system of embodiment 40, wherein the sequence comprises:
    a first crossing network order with a greatest associated crossing network transaction fee is first in the sequence and is evaluated for matches first among the sorted order book, and
    a last crossing network order with a smallest associated crossing network transaction fee is last in the sequence and is evaluated for matches last among the sorted order book.
42. The system of any of embodiments 39-41, wherein the associated crossing network transaction fees comprise percentages of the crossing network orders.
43. The system of any of embodiments 39-42, wherein the associated crossing network transaction fees comprise flat fees of the crossing network orders.
44. The system of any of embodiments 39-43, wherein the associated crossing network transaction fees are individually specified as part of the crossing network orders.
45. The system of any of embodiments 39-44, wherein the execution of the crossing network program further comprises:
    providing, to at least one of the client devices, information that indicates the greatest associated crossing network transaction fee from among the associated crossing network transaction fees.
46. The system of any of embodiments 39-45, wherein the execution of the crossing network program further comprises:
    receiving, after providing the information and from the at least one of the client devices, updated crossing network transaction fees for a portion of the crossing network orders associated with the at least one of the client devices, wherein the updated crossing network comprise an increased network transaction fees; and
    sorting the crossing network orders within the order book based on the updated crossing network transaction fees.
47. The system of any of embodiments 39-46, wherein the execution of the crossing network program further comprises:
    iteratively performing the providing, the receiving, and the sorting steps based on the updated crossing network transaction fees.
48. The system of any of embodiments 39-47, wherein the execution of the crossing network program further comprises:

deducting associated crossing network transaction fees from accounts within the crossing network that correspond to the matched crossing network orders.

What is claimed is:

1. A system to provide a secure crossing network for trading digital assets outside of an exchange, the system comprising:
a crossing network program that is configured to provide a crossing network for the digital assets;
a computer system with a secure enclave that is configured to provide a trusted execution environment within which processing of programs is secure from observation and manipulation by other operations outside of the secure enclave, wherein execution of the crossing network program in the secure enclave comprises:
loading the crossing network program into secure memory within the secure enclave;
generating and providing, in response to a remote attestation challenge, one or more validation values generated based on at least a portion of the crossing network program loaded into the secure memory, the one or more validation values being used by one or more other computer systems to validate the crossing network program is authentic and unmodified;
receiving, from client devices, crossing network orders to trade assets within the crossing network, wherein each of the crossing network orders indicates a first type of asset to be removed from a client account and a second type of asset to be added to the client account during a trade, and an amount of the first type of asset or the second type of asset;
as the crossing network orders are received by the crossing network, adding the crossing network orders to a pool of crossing network orders in an order book maintained within the secure memory for the crossing network;
determining a parameter for performing a matching process, based on a factor that is independent of the pool of crossing network orders in the order book;
matching at least a portion of the crossing network orders in the pool of crossing network orders in the order book, according to the determined parameter for performing the matching process, wherein the matching process is periodically performed across a plurality of differing time intervals, that, on average, correspond to a τ period of time;
after matching at least a portion of the crossing network orders in the order book, (i) removing the matched crossing network orders from the pool of crossing network orders in the order book, (ii) obtaining, from one or more pricing oracles situated outside of the enclave, pricing information from outside the enclave, wherein the pricing information pertains to historic transactions that involved the first type of asset and the second type of asset and that occurred in the exchange separate from the enclave during a time period in which the order matching was performed, wherein obtaining the pricing information is performed independently of the order matching, and (iii) based on an outcome of a stochastic process, determining a next time interval of the plurality of differing time intervals for performing a next matching process, wherein the stochastic process ensures that an average time interval of the plurality of differing time intervals corresponds to the τ period of time;
after obtaining the pricing information from outside of the enclave, determining a reference price for crossing network orders that were matched within the crossing network during the time period, based on the pricing information from the exchange separate from the enclave; and
filling the matched crossing network orders within the crossing network at the reference price.

2. The system of claim 1, wherein the execution of the crossing network program in the secure enclave further comprises:
receiving the remote attestation challenge from the one or more other computing systems outside the secure enclave; and
wherein one or more values are transmitted to the one or more other computing systems.

3. The system of claim 1, wherein the reference price is determined based on a median of the pricing information provided by a plurality of pricing oracles.

4. The system of claim 1, wherein the reference price is determined based on excluding one or more outlier prices from among the historic transactions to which the pricing information pertains.

5. The system of claim 1, wherein adding a crossing network order to the order book is performed in response to determining that a transaction size of the crossing network order meets a minimum transaction size.

6. The system of claim 1, further comprising:
transmitting a unique transaction identifier for the crossing network orders to the client devices;
receiving a cancellation request for a particular crossing network order identified by a particular transaction identifier; and
removing the particular crossing network order from the order book based on the cancellation request.

7. The system of claim 1, further comprising:
determining whether a crossing network order satisfies one or more conditions for being matched to another order in the order book; and
wherein the crossing network order is matched to the another order in the order book in response to the orders satisfying the one or more conditions.

8. The system of claim 7, wherein the one or more conditions comprise a price band, wherein the crossing network order is matched to the another order in the order book when the reference price is within the price band.

9. The system of claim 7, wherein the one or more conditions comprise a corresponding account for the crossing network order having a sufficient account balance to complete the order, wherein an account has a sufficient balance when the account has a current balance to cover a quantity of digital currency specified in the order and to cover an associated fee for the transaction within the crossing network.

10. The system of claim 1, further comprising:
identifying that a particular crossing network order associated with a particular account includes a prioritization request;
deducting a prioritization fee from the particular account; and
adding the particular crossing network order to a prioritized position in the order book.

11. The system of claim 1, further comprising:
a notification system outside of the secure enclave that is configured to transmit notifications to the client devices in response to transaction activity within the crossing network.

12. The system of claim 1, wherein the crossing network orders comprise market orders that include one or more conditions, wherein the one or more conditions comprise one or more of a duration during which the market order is valid, and a price range within which the market order is valid.

13. The system of claim 12, wherein the execution of the crossing network program further comprises:
receiving, from a first client device, a request to broadcast partial information related to a first crossing network order associated with the first client device;
identifying, from the order book, the partial information for the first crossing network order; and
providing information that indicates the partial information for the first crossing network order to at least a portion of the client devices, wherein the partial information identifies at least one of the one or more conditions for the first crossing network order.

14. The system of claim 1, wherein:
the crossing network maintains client accounts with account balances that identify digital assets tradable within the crossing network for the client accounts, and
wherein the execution of the crossing network further comprises depositing the digital assets into the client accounts, comprising:
withdrawing the digital assets from the crossing network and transferring the digital assets into one or more accounts associated with the crossing network, the one or more accounts being external to the crossing network, and
in response to detecting and verifying the transfer of the digital assets into the one or more accounts, incrementing the account balance for a corresponding client account within the crossing network.

15. The system of claim 14, wherein:
the digital assets comprise blockchain digital assets,
transferring the digital assets into the one or more accounts comprises transferring blockchain tokens into one or more on-chain wallets associated with the crossing network, and
the incrementing the account balance is performed in response to detecting and verifying the transfer of the blockchain tokens into the one or more on-chain wallets, wherein the incrementing the account balance is performed while maintaining the corresponding blockchain tokens within the one or more on-chain wallets and while maintaining the corresponding digital assets within the one or more accounts.

16. The system of claim 15, wherein:
withdrawing the digital assets from the crossing network comprises:
identifying a quantity of the digital assets to be withdrawn and a destination address corresponding to a client's on-chain wallet,
transferring one or more tokens corresponding to the quantity of digital assets from the on-chain wallets associated with the crossing network to the client's on-chain wallet, and
updating a corresponding account balance within the crossing network to reflect withdrawal of the digital assets.

17. The system of claim 14, wherein:
withdrawing the digital assets from the crossing network comprises:
identifying a quantity of the digital assets to be withdrawn and a destination address corresponding to a client's external account outside the crossing network,
transferring one or more digital assets corresponding to the quantity of digital assets from the one or more accounts associated with the crossing network to the client's external account, and
updating a corresponding account balance within the crossing network to reflect withdrawal of the digital assets.

18. The system of claim 1, wherein the matching process is performed continuously in response to each of the crossing network orders being received and added to the order book.

19. The system of claim 1, wherein the matching process is performed independently of receiving and adding the crossing network orders to the order book.

20. The system of claim 1, further comprising:
performing the stochastic process to generate a random number, and adjusting a predetermined time interval by the generated random number; and
determining that an amount of time that corresponds to the adjusted predetermined time interval has elapsed since a previous matching of crossing network orders in the order book;
wherein the matching of at least the portion of the crossing network orders is initiated in response to determining that the amount of time that corresponds to the adjusted predetermined time interval has elapsed since the previous matching of crossing network orders in the order book.

21. The system of claim 1, wherein:
the crossing network orders include associated crossing network transaction fees,
the crossing network orders are added to the order book with the associated crossing network transaction fees, and
the execution of the crossing network program further comprises:
sorting the crossing network orders within the order book based on the associated crossing network transaction fees.

22. The system of claim 21, wherein the matching is performed by sequentially evaluating each of the crossing network orders in the order book for matches according to a sequence provided by the sorted order book.

23. The system of claim 22, wherein the sequence comprises:
a first crossing network order with a greatest associated crossing network transaction fee is first in the sequence and is evaluated for matches first among the sorted order book, and
a last crossing network order with a smallest associated crossing network transaction fee is last in the sequence and is evaluated for matches last among the sorted order book.

24. The system of claim 21, wherein the execution of the crossing network program further comprises:
providing, to at least one of the client devices, information that indicates the greatest associated crossing network transaction fee from among the associated crossing network transaction fees.

25. The system of claim 24, wherein the execution of the crossing network program further comprises:
receiving, after providing the information and from the at least one of the client devices, updated crossing network transaction fees for a portion of the crossing network orders associated with the at least one of the client devices, wherein the updated crossing network comprise an increased network transaction fees; and sorting the crossing network orders within the order book based on the updated crossing network transaction fees.

26. The system of claim 25, wherein the execution of the crossing network program further comprises:

iteratively performing the providing, the receiving, and the sorting steps based on the updated crossing network transaction fees.

27. The system of claim 21, wherein the execution of the crossing network program further comprises:

deducting associated crossing network transaction fees from accounts within the crossing network that correspond to the matched crossing network orders.

28. A computer-implemented method to provide a secure crossing network for trading digital assets outside of an exchange, the method comprising:

loading the crossing network program into secure memory within the secure enclave;

generating and providing, in response to a remote attestation challenge, one or more validation values generated based on at least a portion of the crossing network program loaded into the secure memory, the one or more validation values being used by one or more other computer systems to validate the crossing network program is authentic and unmodified;

receiving, from client devices, crossing network orders to trade assets within the crossing network, wherein each of the crossing network orders indicates a first type of asset to be removed from a client account and a second type of asset to be added to the client account during a trade, and an amount of the first type of asset or the second type of asset;

as the crossing network orders are received by the crossing network, adding the crossing network orders to a pool of crossing network orders in an order book maintained within the secure memory for the crossing network;

determining a parameter for performing a matching process, based on a factor that is independent of the pool of crossing network orders in the order book;

matching at least a portion of the crossing network orders in the pool of crossing network orders in the order book, according to the determined parameter for performing the matching process, wherein the matching process is periodically performed across a plurality of differing time intervals, that, on average, correspond to a $\tau$ period of time;

after matching at least a portion of the crossing network orders in the order book, (i) removing the matched crossing network orders from the pool of crossing network orders in the order book, (ii) obtaining, from one or more pricing oracles situated outside of the enclave, pricing information from outside the enclave, wherein the pricing information pertains to historic transactions that involved the first type of asset and the second type of asset and that occurred in the exchange separate from the enclave during a time period in which the order matching was performed, wherein obtaining the pricing information is performed independently of the order matching, and (iii) based on an outcome of a stochastic process, determining a next time interval of the plurality of differing time intervals for performing a next matching process, wherein the stochastic process ensures that an average time interval of the plurality of differing time intervals corresponds to the $\tau$ period of time;

after obtaining the pricing information from outside of the enclave, determining a reference price for crossing network orders that were matched within the crossing network during the time period, based on the pricing information from the exchange separate from the enclave; and filling the matched crossing network orders within the crossing network at the reference price.

29. A non-transitory, computer-readable medium storing one or more instructions executable by a computer system to perform operations for providing a secure crossing network for trading digital assets outside of an exchange, the operations comprising:

loading the crossing network program into secure memory within the secure enclave;

generating and providing, in response to a remote attestation challenge, one or more validation values generated based on at least a portion of the crossing network program loaded into the secure memory, the one or more validation values being used by one or more other computer systems to validate the crossing network program is authentic and unmodified;

receiving, from client devices, crossing network orders to trade assets within the crossing network, wherein each of the crossing network orders indicates a first type of asset to be removed from a client account and a second type of asset to be added to the client account during a trade, and an amount of the first type of asset or the second type of asset;

as the crossing network orders are received by the crossing network, adding the crossing network orders to a pool of crossing network orders in an order book maintained within the secure memory for the crossing network;

determining a parameter for performing a matching process, based on a factor that is independent of the pool of crossing network orders in the order book;

matching at least a portion of the crossing network orders in the pool of crossing network orders in the order book, according to the determined parameter for performing the matching process, wherein the matching process is periodically performed across a plurality of differing time intervals, that, on average, correspond to a $\tau$ period of time;

after matching at least a portion of the crossing network orders in the order book, (i) removing the matched crossing network orders from the pool of crossing network orders in the order book, (ii) obtaining, from one or more pricing oracles situated outside of the enclave, pricing information from outside the enclave, wherein the pricing information pertains to historic transactions that involved the first type of asset and the second type of asset and that occurred in the exchange separate from the enclave during a time period in which the order matching was performed, wherein obtaining the pricing information is performed independently of the order matching, and (iii) based on an outcome of a stochastic process, determining a next time interval of the plurality of differing time intervals for performing a next matching process, wherein the stochastic process ensures that an average time interval of the plurality of differing time intervals corresponds to the $\tau$ period of time;

after obtaining the pricing information from outside of the enclave, determining a reference price for crossing network orders that were matched within the crossing network during the time period, based on the pricing information from the exchange separate from the enclave; and filling the matched crossing network orders within the crossing network at the reference price.

* * * * *